United States Patent
Garceau et al.

(10) Patent No.: US 12,325,346 B2
(45) Date of Patent: Jun. 10, 2025

(54) FLOOR POSITIONING SYSTEM

(71) Applicant: NORCO INDUSTRIES, INC., Compton, CA (US)

(72) Inventors: Bernard F. Garceau, Vandalia, MI (US); Jason Collins, Granger, IN (US); Leonard Yoder, Elkhart, IN (US); Jon Stough, Angola, IN (US)

(73) Assignee: NORCO INDUSTRIES, INC., Compton, CA (US)

( * ) Notice: Subject to any disclaimer, the term of this patent is extended or adjusted under 35 U.S.C. 154(b) by 333 days.

(21) Appl. No.: 17/933,682

(22) Filed: Sep. 20, 2022

(65) Prior Publication Data

US 2023/0025353 A1     Jan. 26, 2023

Related U.S. Application Data

(63) Continuation of application No. 17/247,026, filed on Nov. 24, 2020, now Pat. No. 11,447,057.

(60) Provisional application No. 62/939,926, filed on Nov. 25, 2019.

(51) Int. Cl.
*B60P 3/36* (2006.01)
*B60P 1/02* (2006.01)
*B60P 3/34* (2006.01)
*B62D 25/20* (2006.01)

(52) U.S. Cl.
CPC ............... *B60P 3/36* (2013.01); *B60P 1/02* (2013.01); *B60P 3/34* (2013.01); *B62D 25/20* (2013.01)

(58) Field of Classification Search
CPC ......... A61B 34/30; A61B 34/71; F41B 5/105; F41B 5/10; A63B 21/154; A63B 21/0628; A63B 21/4035; A63B 21/4047; C12Q 2600/158
See application file for complete search history.

(56) References Cited

U.S. PATENT DOCUMENTS

| | | | |
|---|---|---|---|
| 1,824,369 A | 9/1931 | Reid et al. | |
| 2,127,966 A | 8/1938 | Strid et al. | |
| 2,750,225 A | 6/1956 | Mettetal | |
| 3,043,454 A | 7/1962 | Butler et al. | |
| 4,329,928 A | 5/1982 | Shaw | |
| 4,452,440 A | 6/1984 | Fagan et al. | |
| 4,738,575 A | 4/1988 | Blodgett | |
| 4,837,877 A | 6/1989 | Hamada | |
| 4,992,013 A | 2/1991 | Westerdale | |
| 5,216,782 A | 6/1993 | Schenck et al. | |
| 5,286,149 A | 2/1994 | Seay et al. | |

(Continued)

OTHER PUBLICATIONS

Users Manual for HAPPIJAC (PNP Bedlift Manual). https://happijac_com/images/pdfs/Bed-Lift%20User%20Manual2012.pdf. 6 pages.

*Primary Examiner* — Mark R Wendell
(74) *Attorney, Agent, or Firm* — Vorys, Sater, Seymour and Pease LLP; Mark A. Watkins

(57) ABSTRACT

A positioning system for controlling movement and position of a floor or platform within an enclosure. The enclosure may be that of a recreational vehicle and/or may be that of a room of a building, such as a garage or living quarter. The positioning system may include a motor and a plurality of cables configured to vertically slide the floor within the enclosure. The floor may be coupled to the enclosure within a plurality of channels that are connected to the enclosure at corners of the floor.

20 Claims, 17 Drawing Sheets

(56) References Cited

U.S. PATENT DOCUMENTS

| | | | |
|---|---|---|---|
| 5,525,026 | A | 6/1996 | Demonte et al. |
| 5,669,745 | A | 9/1997 | Anderson |
| 6,241,048 | B1 | 6/2001 | Heilmann |
| 6,845,848 | B1 | 1/2005 | Kritzer |
| 7,150,449 | B1 | 12/2006 | Dueck et al. |
| 7,246,844 | B2 | 7/2007 | Guidry |
| 7,416,055 | B2 | 8/2008 | Penn et al. |
| 7,575,098 | B2 | 8/2009 | Hartley |
| 8,136,181 | B2 | 3/2012 | Roepke |
| 8,418,814 | B1 | 4/2013 | Byers |
| 8,651,545 | B2 | 2/2014 | Rasmussen |
| 9,909,713 | B1 | 3/2018 | Brockie |
| 10,106,070 | B2 | 10/2018 | Rasmussen |
| 10,654,398 | B1 | 5/2020 | Goldenberg et al. |
| 11,447,057 | B2 * | 9/2022 | Garceau .................. B60P 3/36 |
| 2004/0226271 | A1 | 11/2004 | Suolahti |
| 2004/0262949 | A1 | 12/2004 | Rasmussen |
| 2006/0153656 | A1 | 7/2006 | Clive-Smith |
| 2014/0159410 | A1 | 6/2014 | Rasmussen |
| 2019/0308546 | A1 | 10/2019 | Hop |
| 2020/0215385 | A1 | 7/2020 | Fowler |
| 2021/0070592 | A1 | 3/2021 | Schwartz et al. |
| 2021/0155144 | A1 | 5/2021 | Garceau et al. |

\* cited by examiner

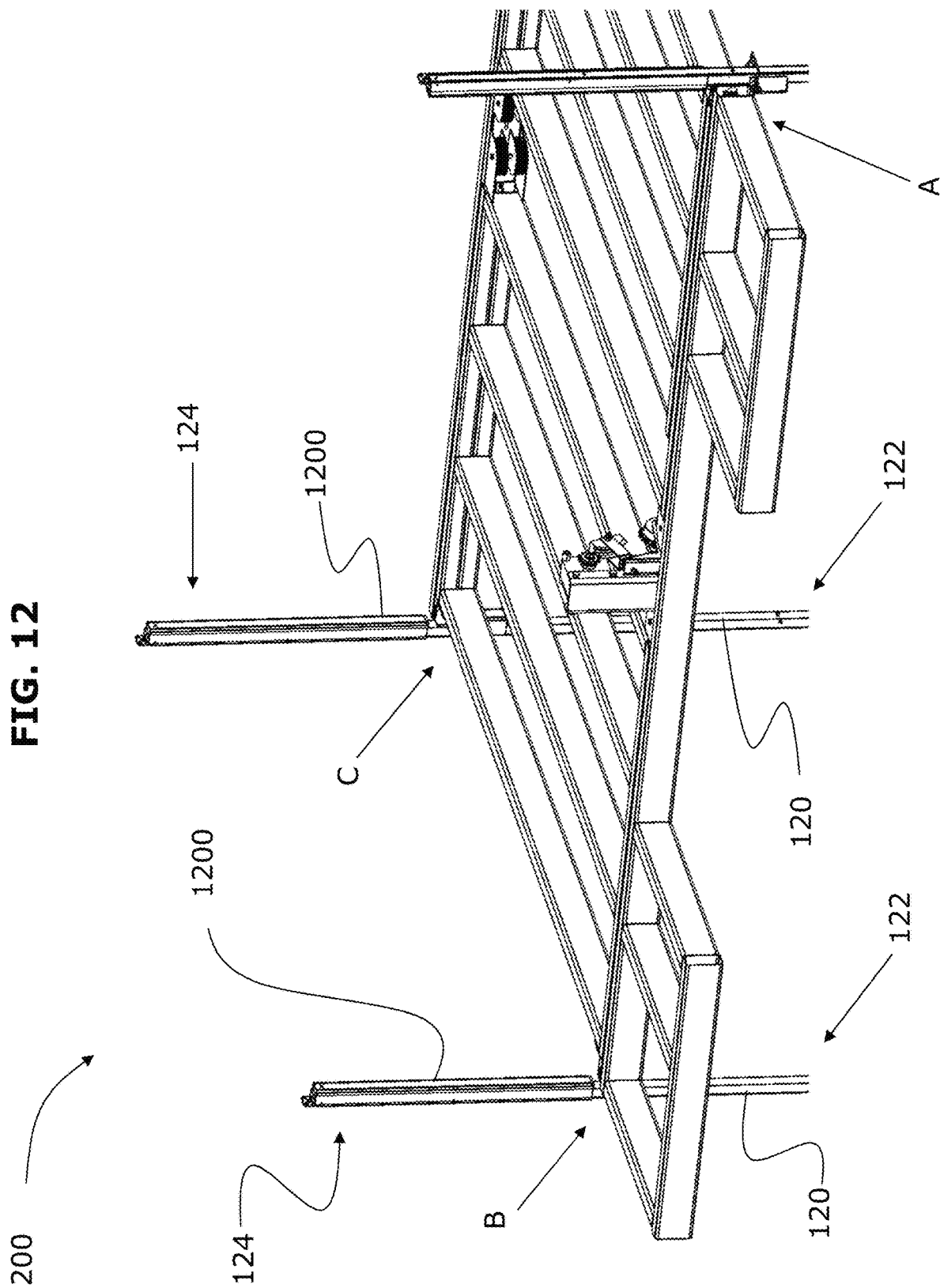

FLOOR POSITIONING SYSTEM

CROSS-REFERENCE TO RELATED APPLICATIONS

This patent application is a Continuation application which claims priority to U.S. patent application Ser. No. 17/247,026 filed on Nov. 24, 2020, which is incorporated herein in its entirety, and which in turn claims priority to and the benefit of Provisional Patent Application Ser. No. 62/939,926 filed on Nov. 25, 2019, which is incorporated by reference herein in its entirety.

BACKGROUND

Recreational vehicles, including motor homes, fifth wheel trailers and travel trailers may be provided with a toy hauler feature. The toy hauler feature provides a separate rear room or compartment of the recreational vehicle in which to store ATVs or motorcycles or other vehicles or the like (i.e., "toys"). The toy hauler feature may have a gate or door, for example at a rear or side of the recreational vehicle, which may be opened and deployed as a ramp on which that toys may be loaded or unloaded from the space within the recreational vehicle. The separate room or compartment within the toy hauler feature may include a positionable floor, that may be moved to make room for the toys and/or that may be moved to make the room or compartment a more comfortable living space. For example, the positionable floor may be have a living space provided on it, such as a bedroom, wherein the positionable floor may be moved into an upper position to create space below the positionable floor for "toys", or the positionable floor may be lowered into a lower position such that the living space on the floor is more utilizable by occupants of the recreational vehicle (i.e., "roomier") and such that the area for toys is minimized or even eliminated.

SUMMARY

Various details of the present disclosure are hereinafter summarized to provide a basic understanding. This summary is not an extensive overview of the disclosure and is neither intended to identify certain elements of the disclosure, nor to delineate the scope thereof. Rather, the primary purpose of this summary is to present some concepts of the disclosure in a simplified form prior to the more detailed description that is presented hereinafter.

Embodiments disclosed herein include a system for positioning a movable floor within a structure. The system may comprise a drive chain supported by the movable floor; a first set of cables, each of the first set of cables having a first end attachable to the drive chain and a second end attachable at an upper end of the structure; a second set of cables, each of the second set of cables having a first end attachable to the drive chain and a second end attachable at a lower end of the structure; and a plurality of pulleys positioned on the movable floor, the plurality of pulleys routing each of the first set of cables from the drive chain to the upper end of the structure and routing each of the second set of cables from the drive chain to the lower end of the structure; wherein actuation of the drive chain in a first direction pulls the first set of cables while providing slack in the second set of cables to thereby translate the movable floor towards the upper end of the structure. In a further embodiment, actuation of the drive chain in an opposite second direction pulls the second set of cables while providing slack in the first set of cables to thereby translate the movable floor towards the lower end of the structure. In another further embodiment, the system further comprises a plurality of channels secured to walls of the structure, each of the first set of cables being routed from a respective one of the pulleys upward through a respective one of the channels to the upper end of the structure. In a further embodiment, the system further comprises a plurality of channels secured to walls of the structure, each of the second set of cables being routed from a respective one of the pulleys downward through a respective one of the channels to the lower end of the structure. In a further embodiment, the drive chain is a strand of chain having a first chain end and a second chain end. In another further embodiment, the first end of each of the first set of cables is attached to the first chain end and the first end of each of the second set of cables is attached to the second chain end. In a further embodiment, the system further comprises a motor driven sprocket supported by the movable floor, wherein at least a portion of the drive chain engages the motor driven sprocket. In a further embodiment, the plurality of pulleys comprises a pair of first pulleys, wherein each of the first set of cables and each of the second set of cables being guided by either of the pair of first pulleys. In another further embodiment, each of the pair of first pulleys includes a first set of pulley wheels and a second set of pulley wheels, the first set of cables engaging the first set of pulley wheels of the first pulleys and the second set of cables engaging the second set of pulley wheels of the first pulleys. In another further embodiment, the first set of pulley wheels of the pair of first pulleys includes a first pair of wheels in a first plane and a second pair of wheels in a second plane parallel with the first plane, and the second set of pulley wheels of the pair of first pulleys includes a third pair of wheels in a third plane and a fourth pair of wheels in a fourth plane parallel with the third plane. In another further embodiment, the first set of cables includes four drive cables, the first and second drive cables each engaging one of the first pair of wheels, and the third and fourth drive cables each engaging one of the second pair of wheels, and wherein the second set of cables includes four drive cables, the first and second drive cables of the second set each engaging one of the third pair of wheels, and the third and fourth drive cables of the second set each engaging one of the fourth pair of wheels. In another further embodiment, the plurality of pulleys further comprises a pair of second pulleys supported on the movable floor opposite the first pulleys. In another further embodiment, each of the second pulleys includes a first and second wheel, the first wheels of the second pulleys being engaged by a pair of drive cables of the first set of cables and the second wheels of the second pulleys being engaged by a pair of drive cables of the second set of cables. In another further embodiment, the plurality of pulleys further comprises a plurality of third pulleys supported at a periphery of the movable floor. In another further embodiment, each of the third pulleys includes a first wheel and a second wheel, the first wheel routing one of the first set of cables upward towards the upper end and the second wheel routing one of the second set of cables downwards towards the lower end. In a further embodiment, the system further comprises a plurality of channels secured to walls of the structure, each of the first set of cables being routed from a respective one of the pulleys upward through a respective one of the channels to the upper end of the structure, and each of the second set of cables being routed from a respective one of the pulleys downward through a respective one of the channels to the lower end of the structure, wherein the first and second wheels of each of the third pulleys at least partially extends into a pathway defined in the respective channel. In a further embodiment, at least some of the first set of cables and/or second set of cables extend through pathways defined within the movable floor. In a further embodiment, the first ends of the first set of cables and the first ends of the second set of cables are adjustably connected to the drive chain. In a further embodiment, the second ends of the first set of cables and the second ends of the second set of cables are adjustably connected to the structure. In a further embodiment, the system further comprises upper position limits.

BRIEF DESCRIPTION OF THE DRAWINGS

The following figures are included to illustrate certain aspects of the present disclosure, and should not be viewed as exclusive embodiments. The subject matter disclosed is capable of considerable modifications, alterations, combinations, and equivalents in form and function, without departing from the scope of this disclosure.

FIG. 12 illustrates a channel cover utilizable with the floor positioning system of FIGS. 2-3, according to one or more embodiments of the present disclosure.

DETAILED DESCRIPTION

The present disclosure is related to recreational vehicles and, more particularly, to floor positioning systems utilizable in recreational vehicles.

The embodiments described herein provide a positioning system for controlling movement and position of a floor or platform within an enclosure. The positioning system may include a motor and a plurality of cables configured to vertically slide the floor within the enclosure. The floor may be coupled to the enclosure within a plurality of channels that are connected to the enclosure, for example, at corners of the floor.

Figure 1:
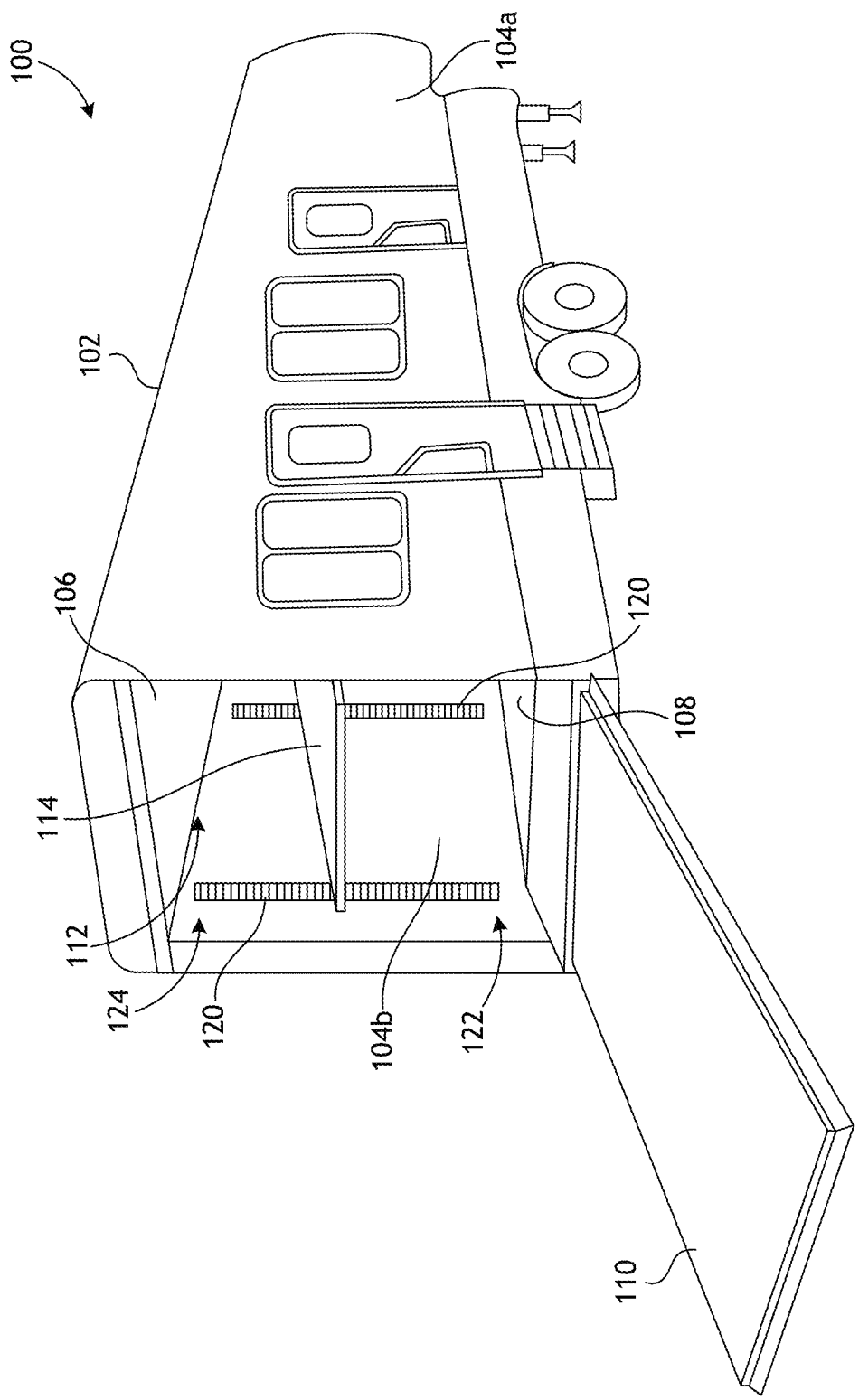
FIG. 1 is an isometric rear view of an example the recreational vehicle that may incorporate the principles of the present disclosure.

FIG. 1 is an isometric rear view of an example recreational vehicle 100 that may incorporate the principles of the present disclosure. The depicted recreational vehicle 100 is just one example recreational vehicle that can suitably incorporate the principles of the present disclosure. Indeed, many alternative designs and configurations of the recreational vehicle 100 may be employed, without departing from the scope of this disclosure. While the recreational vehicle 100 is illustrated as a fifth wheel trailer in FIG. 1, it will be appreciated that recreational vehicle 100 may instead embody motor home, a travel trailer, a utility trailer, or various other types of recreational or non-recreational vehicles. In addition, the recreational vehicle 100 may be one that is designed for living (e.g., as a house trailer) or one that may be designed for work (e.g., a mobile office or library), etc. Accordingly, the recreational vehicle 100 may be a self-powered vehicle or may be a trailer that is adapted to be towed, for example, by an automobile or a truck. It will be appreciated that, while embodiments herein are described with reference to recreational vehicles, they may be implemented in other applications, such as in a stationary structure (e.g., a residential garage or other living space within home).

As illustrated, the recreational vehicle 100 includes a body or enclosure 102, which is coupled to a frame (not illustrated). The body 102 includes a front wall (not illustrated), a first sidewall 104a, an opposite second sidewall 104b, a ceiling 106, a floor 108, and a rear wall 110. The body 102 defines an interior space 112 within which the occupants of the vehicle 100 may live and/or work and/or within which "toys" (not pictured) may be stored. At least a portion of the interior space 112 may be utilized as a cargo area where "toys" (e.g., four-wheelers, motorcycles, snowmobiles, dune buggies, personal watercraft, cars, trucks, drones, and the like) may be stowed and transported to the various destinations with the recreational vehicle 100.

In the illustrated example, the rear wall 110 is configured as a door or gate that may be moved between an open and closed position. Here, the rear wall 110 is pivotally attached to the body 102, such that the rear wall 110 may pivot about an axis into the open position from a closed position and vice versa. FIG. 1 illustrates the rear wall 110 when moved into the open position. Here, the rear wall 110 is also configured as a ramp on which people may walk and/or on which toys may travel and be loaded into or unloaded from the interior space 112. Thus, in the open position, the rear wall 110 may be used as a ramp to drive or otherwise move a "toy" in and out of the cargo area. Once the "toy" has been moved into and/or out of the cargo area, the rear wall 110 may be pivoted upward on the axis into a closed position (not illustrated). When the rear wall 110 is in the closed position and the "toy(s)" is positioned in the cargo area, the "toy(s)" is enclosed within the recreational vehicle 100, thereby protecting it from the elements, theft, etc. In this manner, the recreational vehicle 100 may be used to store and/or transport "toys" as may be desired.

While FIG. 1 illustrates an example where the entire rear wall 110 is provided as the door and ramp, in other examples, less than the entire rear wall 110 may be provided as the door and ramp. Moreover, a door and ramp may be provided differently about the body 102 of the recreational vehicle 100, for example, on the sidewall 104, in addition to or in lieu of the rear wall 110.

The recreational vehicle 100 may further include a platform or floor 114 (or bed) that is movable or positionable within the interior space 112 of the structure or recreational vehicle 100. In this manner, the floor 114 may be moved so as to accommodate differently sized "toys" or other items within the cargo area. The floor 114 may support a living space, such as a bunk or bedroom, and/or may be utilized for one or more various other purposes. Thus, the movable floor 114 may be moved to accommodate occupants within the living space on movable floor 114 and to make such living space more comfortable depending on the size of the occupants. In the illustrated example, the movable floor 114 may be movable in a vertical dimension. Here, for example, the movable floor 114 is vertically positionable between an upper-most position, where the movable floor 114 is proximate to the roof 106, and a lower-most position, where the movable floor 113 is proximate to the floor 108 of the body 102. FIG. 1 illustrates the movable floor 114 when in a position somewhere between the upper-most and lower-most positions. In addition, the movable floor 114 may comprise a frame or weldment that provides structural integrity and support of the movable floor 114 and which may be covered with skin(s) or sheet(s) of material to define exposed outer surfaces of the movable floor 114.

A plurality of tracks or channels 120 may be provided for coupling the movable floor 114 to the body 102. In the illustrated example, four (4) of the channels 120 are provided about the movable floor 114 (e.g., each at a corner of the movable floor 114) to support the movable floor 114 in a particular orientation (e.g., a horizontal orientation). It will be appreciated, however, that FIG. 1 only illustrates the two (2) channels 120 provided on the sidewall 104b as the opposite two (2) channels 120 provided on the opposite sidewall 104a are obstructed from view by the sidewall 104a.

The channels 120 are provided as rails or tracks on which the movable floor 114 may translate (or move or slide). In the illustrated example, the channels 120 each extend in a vertical dimension such that the movable floor 114 is vertically translatable between a bottom end 122 and a top end 124 of the channels 120. The channels 120 may be permanently or temporarily attached to the body 102. For example, the channels 120 may be releasably attached to the sidewalls 104a, 104b such that they may be moved to different positions within the interior compartment 112 as may be desirable. As described herein, the channels 120 may enclose or hide working cables or drive members that are actuatable (or activatable) to cause translation of the movable floor 114. Thus, one or more of the channels 120 may include one or more flap members or covers that close or cover an open side of the channels 120 within which the movable floor 114 is attached to thereby hide the working cables or drive members from view.

A positioning or lifting system may be provided for lifting or moving the movable floor 114 within the interior space 112. The positioning system may include a motor, a drive chain driven by the motor, and a plurality of drive cables connected to the drive chain to cause translation of the movable floor 114 upon actuation of the motor 202. In this manner, the positioning system is utilizable to adjust position of the movable floor 114 within the interior compartment 112 relative to the body 102. In some embodiments, the motor actuates the drive chain in a first or opposite second direction. In such examples, the drive chain may comprise a strand of chain having opposing ends and an intermediate segment (or portion) extending between the opposing ends, with a first set of drive cables attached at the first end of the drive cable and with a second set of drive cables attached at the opposing second end of the drive cable. Here, a drive sprocket may be operatively coupled to the motor, such that the motor is operable to rotate (cause rotation of) the drive sprocket in either the first (or second direction (i.e., in a clockwise or counter clockwise). The drive chain may be wrapped around the drive sprocket such that teeth of the drive sprocket catch and engage rollers of the portion (or segment) of the drive chain passing over the drive sprocket to thereby transmit rotary motion of the drive sprocket to the drive chain, such that the drive chain is driven in the first or second direction. In some examples, the motor is a bi-directional motor.

Figure 2:
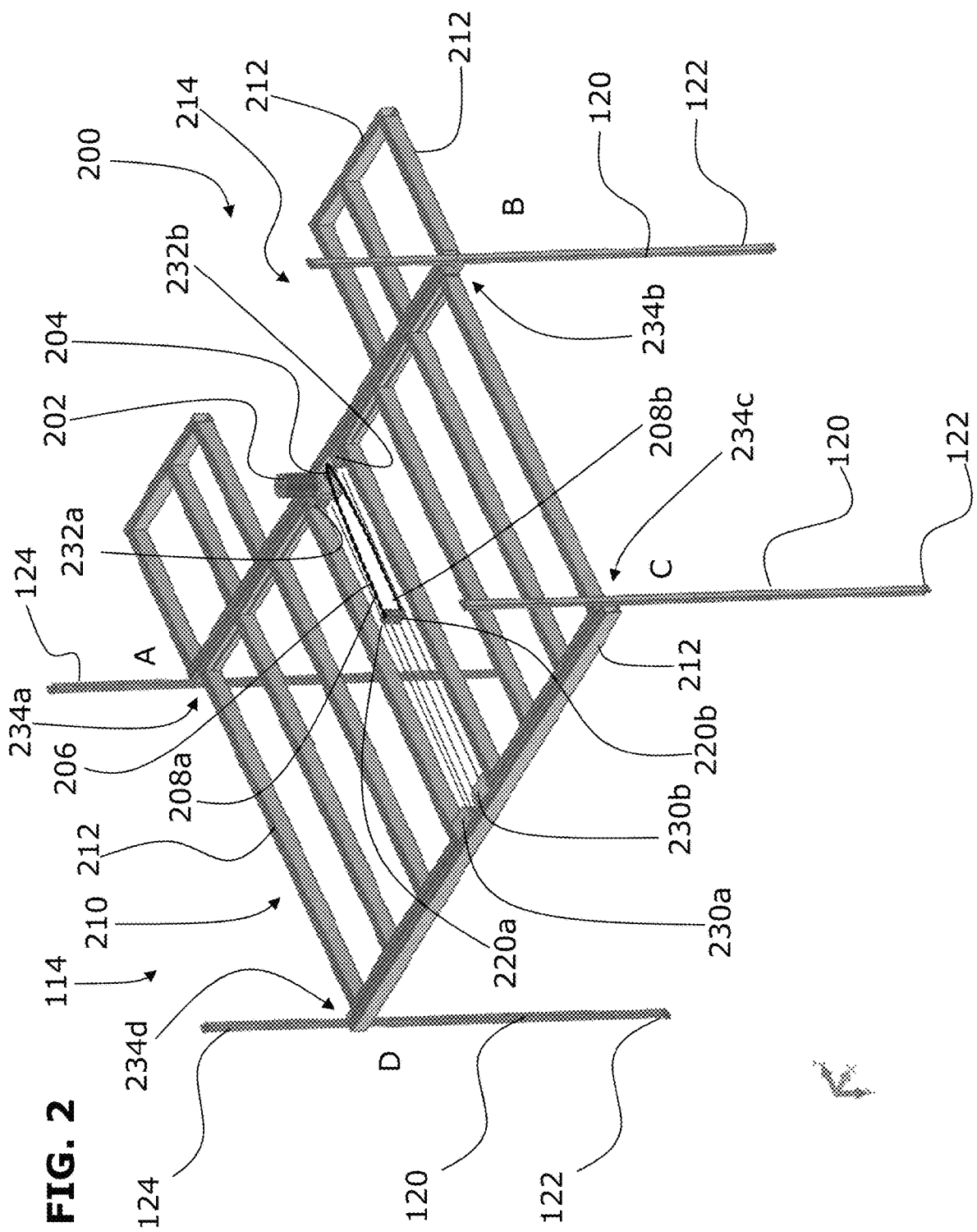
FIG. 2 is an isometric side view of an exemplary floor positioning system, according to one or more embodiments of the present disclosure.
Figure 3:
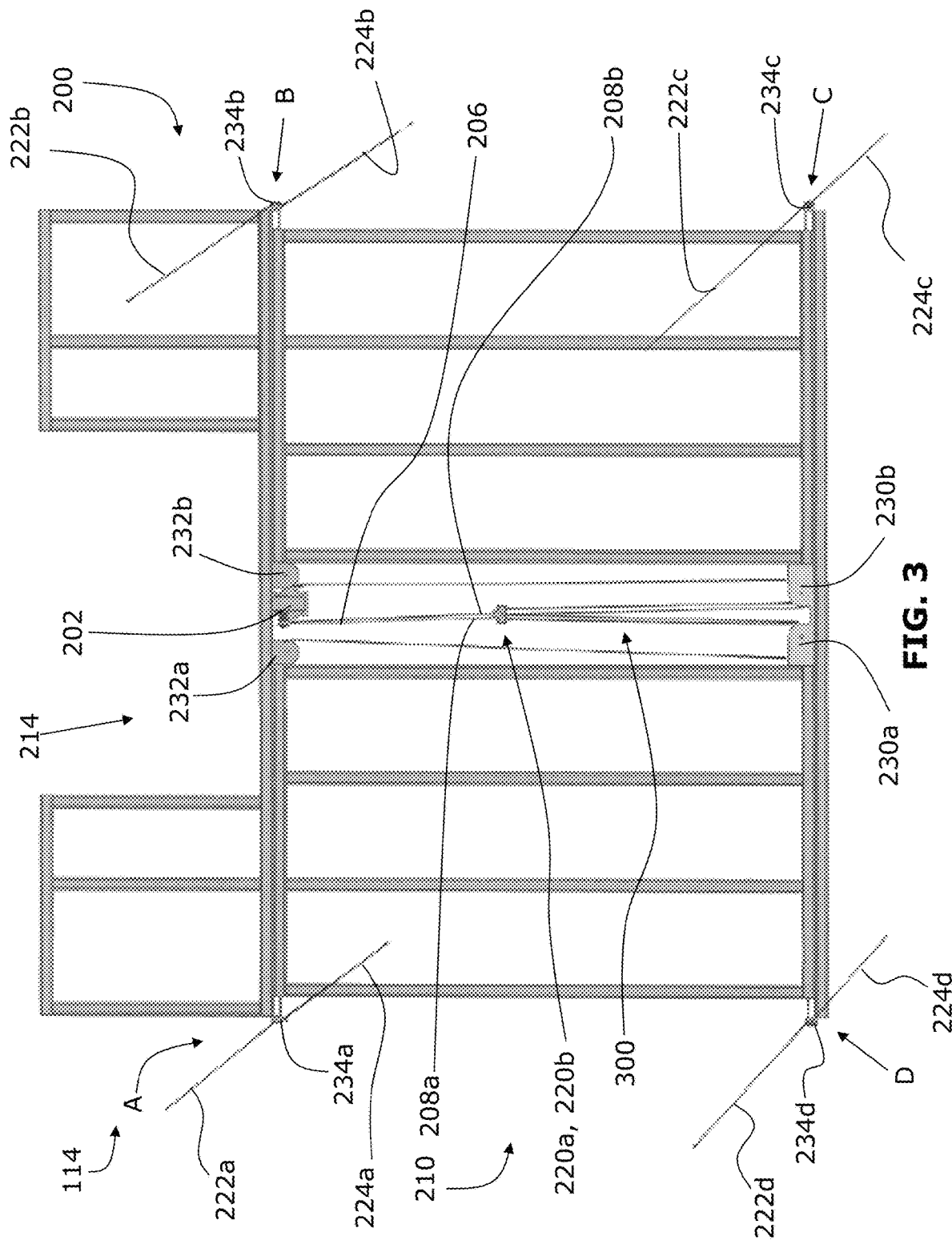
FIG. 3 is a top view of the floor positioning system of FIG. 2.

FIG. 2 illustrates aspects of an exemplary floor positioning system 200, according to one or more embodiments of the present disclosure. FIG. 3 illustrates a top view of the exemplary floor positioning system 200 of FIG. 2. However, in FIG. 3, the channels 120 are not illustrated so as to better illustrate actuation of the floor positioning system 200 via the plurality of cables.

In the illustrated example, the positioning system 200 includes a motor 202. The motor 202 is operatively coupled to a rotatable drive sprocket 204 that is engaged with a drive chain 206. Accordingly, the motor 202 causes rotation of the drive sprocket 204 to thereby actuate the drive chain 206 in a first or second direction. In the illustrated example, the drive chain 206 is a strand of chain with opposing chain ends 208a, 208b (sometimes hereinafter referred to as the first end 208a and the second end 208b of the chain 206). However, in other examples, the drive chain 206 may be arranged as a loop of chain (or a continuous chain) or series of chain strands connected end to end in the form of a continuous loop of chain.

In addition, FIG. 2 illustrates a frame 210 of the movable floor 114. The movable floor 114 may further include a skin or sheet of material covering the frame 210; however, such material is not illustrated in FIG. 2 so as to expose the interior components provided within the movable floor 114. As illustrated, the frame 210 includes a plurality of frame (or channel) members 212. Thus, in the illustrate example, the frame 210 is a weldment of frame members 212. FIG. 2 illustrates an exemplary arrangement of the frame members 212, and the frame 210 may have various other assemblies of frame members 212. As hereinafter described, one or more of the frame members 212 may be configured to permit a cable to travel therein, for example, one or more of the frame members 212 may be hollow or have a cable channel provided therein through which one or more cables may be routed.

Moreover, the frame 210 may have various geometries depending on the space within the interior compartment 112 of the recreational vehicle 100 within which it is to be installed. Accordingly, the frame members 212 may be provided of varying dimensions and attached to each other to define frames 210 of varying shapes and dimensions as may be desirable. Also in the illustrated example, the frame 210 includes a notch or cutout 214 configured to accommodate a "toy" when the movable floor 114 is lowered into a lower position. Thus, the notch 214 in the may have various geometries depending on the type of "toy" or other equipment to be hauled and/or depending on the geometry of the interior compartment 112.

The motor 202 may be provided on board the movable floor 114. In the illustrated example, the motor 202 is mounted at in interior position within the frame 210, for example, on one of the frame members 212. However, the motor 202 may be provided elsewhere about the frame 210.

The positioning system 200 includes a plurality of drive cables (see FIG. 3) actuatable by the motor 202 to cause translation of the frame 210 of the movable floor 114. In this manner, the positioning system 200 is utilizable to adjust position of the movable floor 114 within the interior compartment 112 relative to the body 102. The drive cables are connected to the drive chain 206 and extend therefrom, and are routed through a plurality of pulleys or cable guides to the channels 120, and then are routed to the bottom end 122 or top end 124 of the channels 120 at which point they are secured fastened or secured. Accordingly, each of the cables has a first end attached to the drive chain 206 which is movable with the floor 114 as the floor 114 is vertically positioned and a second end attached proximate to within one of the channels 120 (or to the sidewall 104 of the body 102 at a location thereon proximate to the channel 120) such that the second end of each cable is fixed relative to the movable floor 114. The second ends of each of the drive cables may be anchored to the structure via a variety of anchoring mechanisms or fasteners, and in some examples, one or more of the second ends of the drive cables are adjustably secured to the structure such that their tension may be adjusted as may be desirable.

The plurality of drive cables may be arranged or organized in a first set of cables and a second set of cables. Also, the first end of each drive cable is attached to either the first chain end 208a or the second chain end 208b of the drive chain 206 as hereinafter described. In the illustrated example, the first set of cables includes a first cable 222a, a second cable 222b, a third cable 222c, and a fourth cable 222d, and the second set of cables includes a first cable 224a, a second cable 224b, a third cable 224c, and a fourth cable 224d. Here, the first end of each cable 222a-222d in the first set of cables is attachable to the first end 208a of the drive chain 206 and the second end of each cable 224a-224d in the first set of cables is attachable to the bottom end 122 (or top end 124) of the channel 120. Also here, the first end of each cable in the second set of cables is attachable to the second end 208b of the drive chain 206 and the second end of each cable in the second set of cables is attachable to the top end 124 (or bottom end 122) of the channel 120.

A fitting 220 may be provided on the drive chain 206 for securing the drive cables thereto. For example, a first and second fitting 220a, 220b may be attached to the first and second ends 208a, 208b of the drive cable 206, respectively, with the first end of each cable in the first set of cables being attached to the first fitting 220a at the first end 208a of the drive chain 206, and with the first end of each cable in the second set of cables being attached to the second fitting 220b at the second end 208b of the drive chain 206. The fitting 220 may be configured to allow adjustment of the cables attached thereto and/or the cables may be attached to the fitting 220 with tensioning devices. For example, the fittings 220 may include spring-loaded tensioning bolts/screws that may be tightened or loosened to add or decrease tension in a particular cable as may be desirable (and/or the fittings 220 may include other types of tensioning features), and/or the cables may be coupled to the fittings 220 via separate tensioning device (e.g., a turnbuckle) that may be tightened or loosened to add or decrease tension in a particular cable as may be desirable. Various other tensioning devices may be utilized in addition to and/or in lieu of the foregoing.

A plurality of pulleys or cable guides are provided for routing and redirecting each of the cables from their respective end 208a, 208b of the drive chain 206, through and about the frame 210, and to their opposite ends at which they are secured (fastened or attached) relative to the structure (e.g., the sidewalls 104). In the illustrated example, a pair of first pulleys 230a, 230b are provided on a side of the frame 210 opposite the motor 202 (i.e., a non-motor side of the frame 210), a pair of second pulleys 232a, 232b are provided on a side of the frame 210 on which the motor 202 is provided (i.e., a motor side of the frame 210), and a plurality of third pulleys 234a-d are provided about the periphery of the frame 210 and the movable floor 114 for routing the drive cables into the corresponding channels 120. In the illustrated example, the third pulleys 234a-d are provided at four (4) corners A,B,C,D of the movable floor 114 that correspond in position with the four (4) channels 120 arranged within the interior compartment 112 of the vehicle 100, however, more or less than four of the third pulleys 234a-d may be provided to correspond with implementations having more or less where channels 120. Also, the third pulleys 234a-d may be differently positioned about the movable floor 114 than as illustrated, as may be desirable to provide sufficient and balanced support of the movable floor 114 in any particular end use application.

Figure 4:
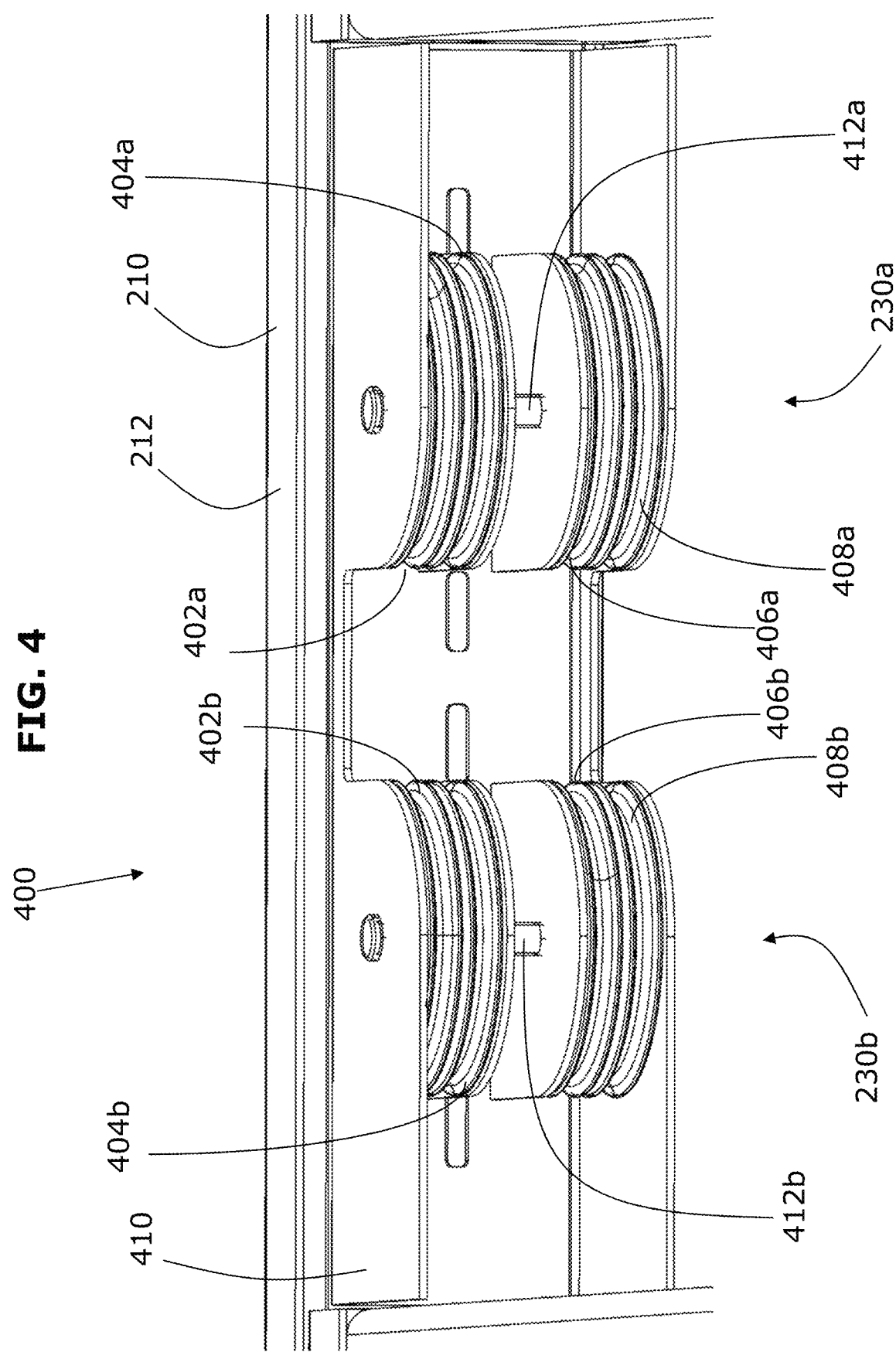
FIG. 4 illustrates an exemplary configuration of first or non-motor side pulleys utilizable with the floor positioning system of FIGS. 2-3, according to one or more embodiments of the present disclosure.

FIG. 4 illustrates the pair of first pulleys 230a, 230b, according to one or more embodiments of the present disclosure. In the illustrated example, each of the first pulleys 230a, 230b is configured as a quad block pulley, meaning they each include four (4) pulley wheels on which a cable may be guided or routed. For example, the first pulley 230a includes a first pulley wheel 402a on or around which a first cable may be provided, a second pulley wheel 404a on or around which a second cable may be provided, a third pulley wheel 406a on or around which a third cable may be provided, and a fourth pulley wheel 408a on or around which a fourth cable may be provided. Also in this example, the other first pulley 230b includes a first pulley wheel 402b on or around which a first cable may be provided, a second pulley wheel 404b on or around which a second cable may be provided, a third pulley wheel 406b on or around which a third cable may be provided, and a fourth pulley wheel 408d on or around which a fourth cable may be provided. In the illustrated example, first and second pulley wheels 402, 404 are grouped as a block and the third and fourth pulley wheels 406, 408 are grouped as a block, with a space provided between the second and third pulley wheels 404, 406; however, they need not have such spacing therebetween, and/or spacing may be provided between any of the other neighboring pulley wheels in addition to or instead of the foregoing.

In the illustrated example, the pair of first pulleys 230a, 230b are provided as an integral pulley assembly 400; however, they may instead be provided as discrete, separate pulley or guide assemblies. Here, the integral pulley assembly 400 includes a bracket 410 (or block or shell) and a pair of shafts 412a, 412b that supports the pair of first pulleys 230a, 230b. More specifically, the bracket 410 supports the shafts 412 on which each of the pulley wheels 402, 404, 406, 408 of the first pulleys 230a, 230b are rotatably mounted, such that each of the pulley wheels 402, 404, 406, 408 may rotate independently of each other on their respective shaft 412.

Figure 5:
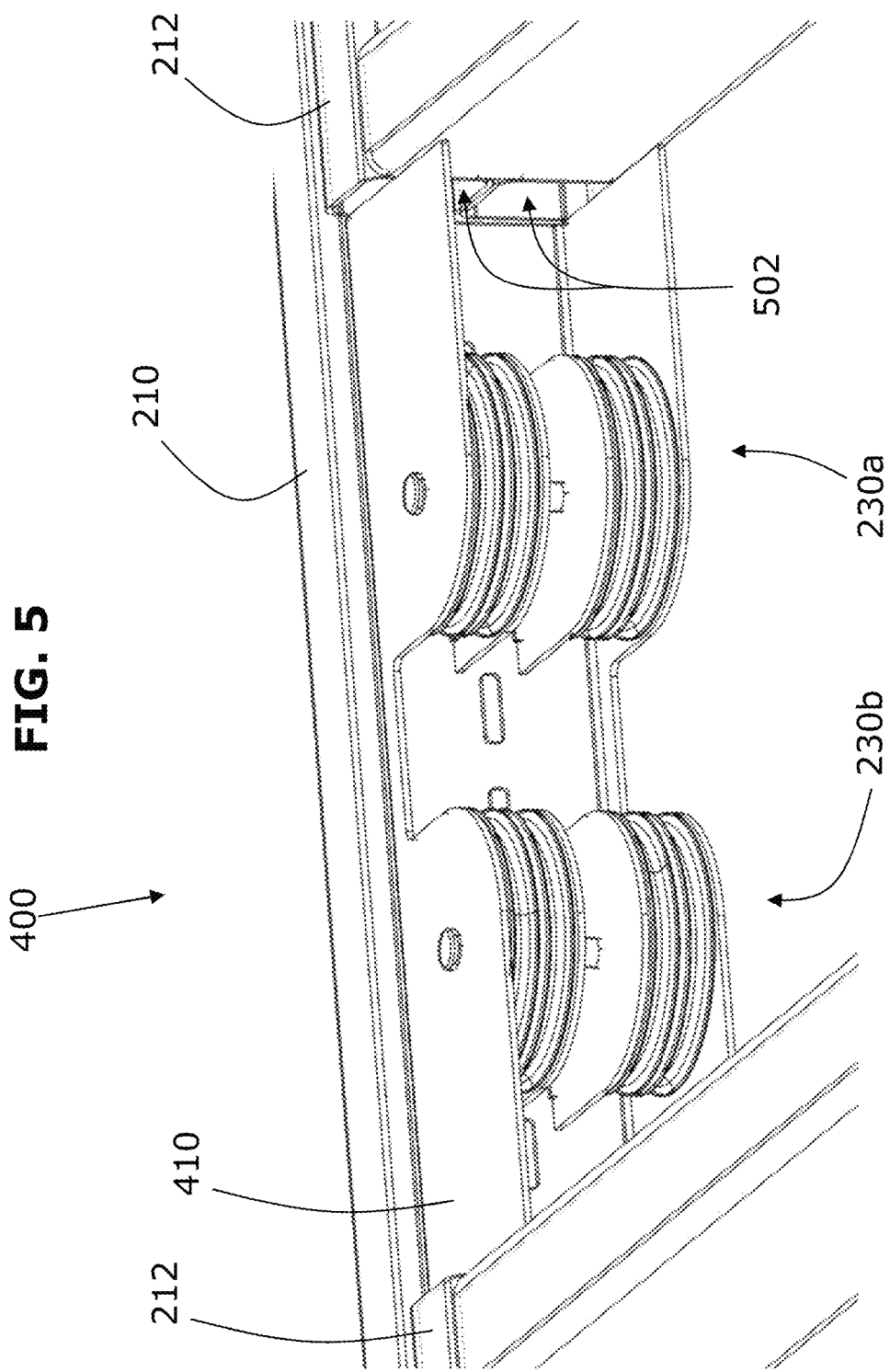
FIG. 5 illustrates the first pulleys of FIG. 4.

FIG. 5 illustrates an example where drive cables may be routed through the frame 210, according to one or more embodiments of the present disclosure. Here, the frame members 212 are hollow and define channels or pathways 502 through which drive cables extending from the pulley wheels 402, 404, 406, 408 of either or both of the pair of first pulleys 230*a*, 230*b* may be directed and fed. In this manner, the drive cables may be contained within the movable floor 114, thereby protecting them from wearing against other components and fraying. It should be appreciated that, while the channels or pathways 502 are only shown formed in the frame member 212 proximate to the first pulley 230*a*, the channels or pathways 502 may also be provided in the frame member 212 proximate to the other first pulley 230*b*. Also, the drive cables extending from one (or both) of the first pulleys 230 may extend therefrom through the same channel 502, or through discrete channels 502 that are separated from each other. For example, drive cable extending from the first and/or second pulley wheel 402*a*, 404*a* may be directed through a top channel 502, whereas drive cable extending from the third and/or fourth pulley wheel 406*a*, 408*a* may be directed through a bottom channel 502 that is separated from the top channel 502.

Figure 6:
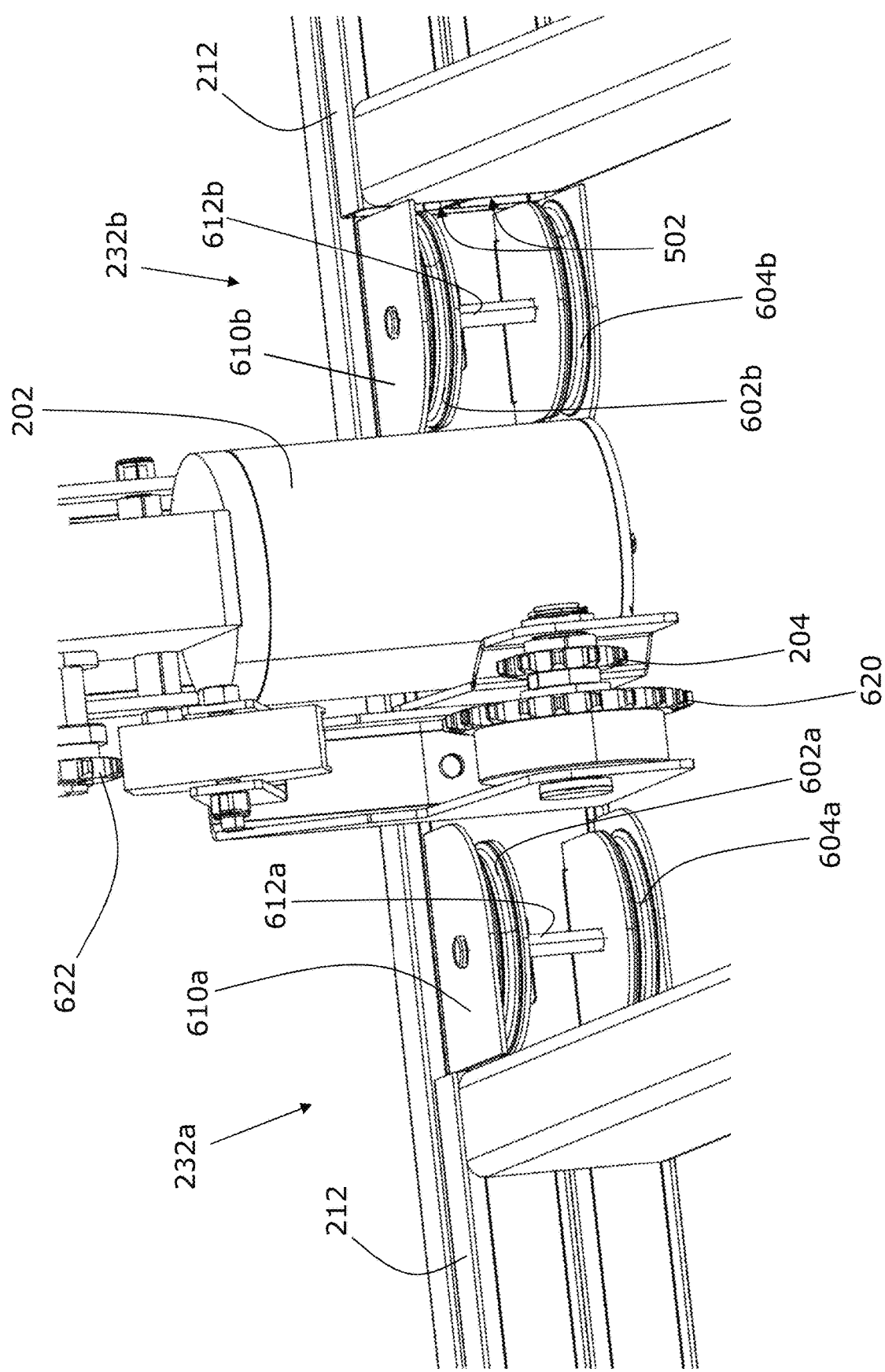
FIG. 6 illustrates an exemplary configuration of second or motor-side pulleys utilizable with the floor positioning system of FIGS. 2-3, according to one or more embodiments of the present disclosure.

FIG. 6 illustrates the pair of second pulleys 232*a*, 232*b*, according to one or more embodiments of the present disclosure. In the illustrated example, each of the second pulleys 232*a*, 232*b* is configured as a double block pulley, meaning they each include two (2) pulley wheels on which a cable may be guided or routed. For example, the second pulley 232*a* includes a first pulley wheel 602*a* on or around which a first cable may be provided and a second pulley wheel 604*a* on or around which a second cable may be provided. Also in this example, the other second pulley 232*b* includes a first pulley wheel 602*b* on or around which a first cable may be provided and a second pulley wheel 604*b* on or around which a second cable may be provided. In the illustrated example, each of the first wheels 602 is a block and each of the second wheels 604 is a block, with a space provided between the first pulley wheel 602*a* and the second pulley wheel 604*a* and a space between the first pulley wheel 602*b* and the second pulley wheel 604*b*; however, either or both spaces need not be provided there-between.

In the illustrated example, the pair of second pulleys 232*a*, 232*b* are provided as discrete, separate pulley or guide assemblies; however, in other examples, they may be connected together and provided as an integral pulley assembly, similar as described with reference to the integral pulley assembly 400 of FIGS. 4-6. Here, each of the second pulleys 232*a*, 232*b* includes a bracket 610*a*, 610*b* (or block or shell) and a shaft 612*a*, 612*b*, with the first and second pulley wheels 602*a*, 604*a* rotatably mounted on the first shaft 612*a* and the first and second pulley wheels 602*b*, 604*b* rotatably mounted on the second shaft 612*b*. In this manner, the pulley wheels 602, 604 may all rotate independent of each other on their respective shaft.

FIG. 6 also illustrates the channels or pathways 502 defined in one or more of the frame members 212 through which drive cables extending from the pulley wheels 602, 604 of either or both of the pair of second pulleys 232*a*, 232*b* may be directed and fed. It should be appreciated that, while the channels or pathways 502 are only shown formed in the frame member 212 proximate to the second pulley 232*b*, the channels or pathways 502 may also be provided in the frame member 212 proximate to the other second pulley 232*a*. In the illustrated example, there exists a pair of discrete pathways 502, such that the drive cable extending from the first pulley wheel 602 (e.g., 602*a* and/or 602*b*) extends through a first channel, and the drive cable extending from the second pulley wheel 604 (e.g., 604*a* and/or 604*b*) extends through a second channel 502 that is separated from or unconnected with the first channel 502. To provide these discrete and separated channels 502, separate frame members 212 may be connected together with each frame member 212 defining a discrete channel 502.

In addition, FIG. 6 illustrates an example where the drive sprocket 204 is indirectly attached to the motor 202. In this example, the drive sprocket 204 is coupled to the motor 202 via a timing belt (or chain). Here, the drive sprocket 204 is rotationally fixed with a timing sprocket 620, such that they rotate together or in unison, and the motor 202 drives a first sprocket 622 that coupled to the timing sprocket 620 via the timing belt (not illustrated). For example, the motor 202 causes rotation of the first sprocket 622, thereby actuating the timing belt which engages the timing sprocket 620, which in turn causes rotation of the timing sprocket 620, and rotation of the timing sprocket 620 is thereby transferred to the drive sprocket 204 via the common shaft on which both the drive sprocket 204 and timing sprocket 620 are fixed or mounted.

FIGS. 7-10 illustrate the third pulleys 234*a-d* at the corners A-D of the movable floor 114 when engaged with a respective channel 120, according to one or more embodiments of the present disclosure. In particular, FIGS. 7-10 illustrate each of the four (4) third pulleys 234*a-d* at their respective corner A-D.

Figure 7:
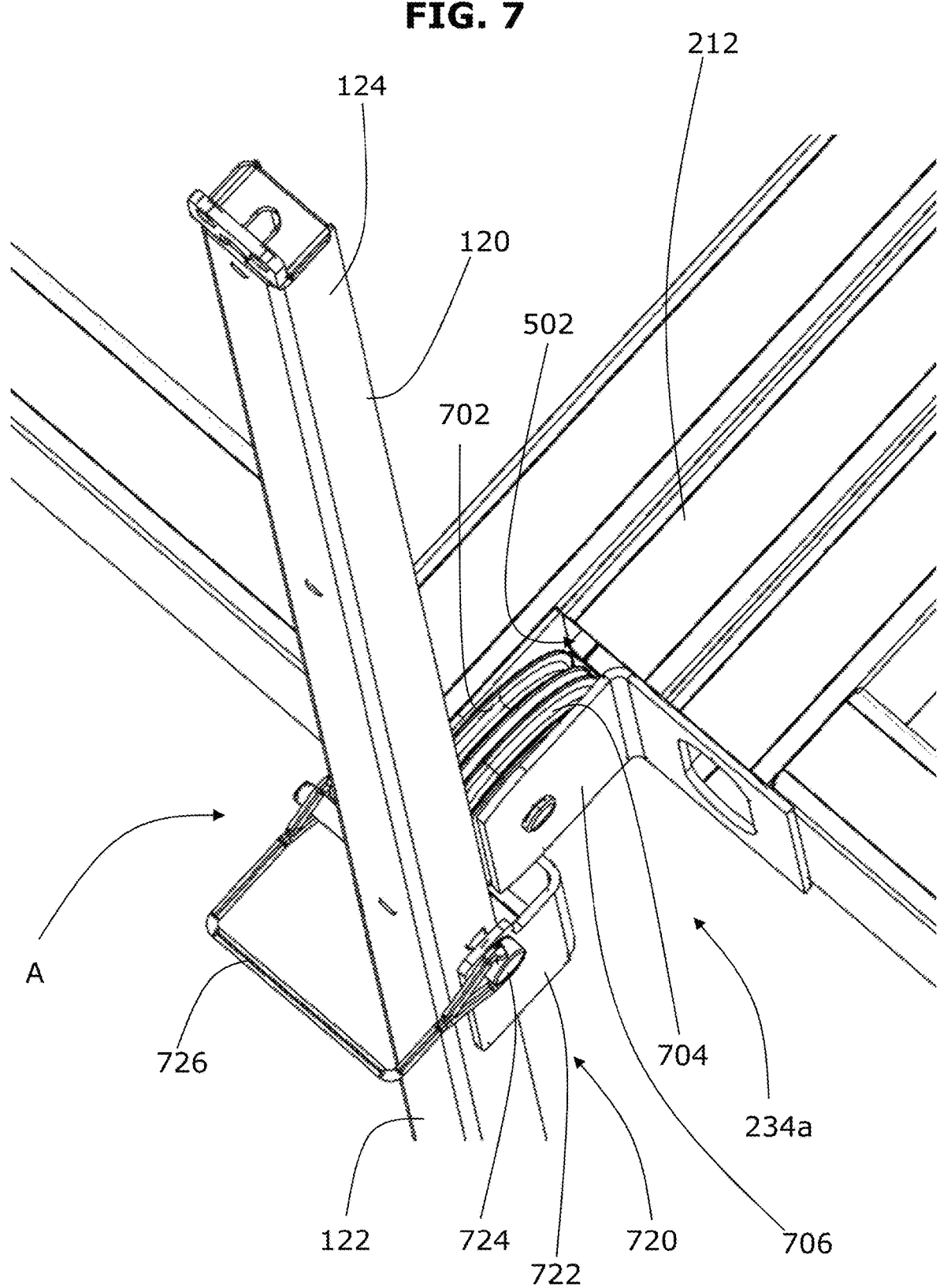
FIG. 7 illustrates a pulley at corner A utilizable with the floor positioning system of FIGS. 2-3, according to one or more embodiments of the present disclosure.

FIG. 7 illustrates the third pulley 234*a* at corner A, according to one or more embodiments of the present disclosure. In the illustrated example, the third pulley 234*a* is configured as a double block pulley, meaning it includes two (2) pulley wheels on which two corresponding drive cables may be guided or routed. For example, the third pulley 234*a* includes a first pulley wheel 702 on or around which a first cable may be provided and a second pulley wheel 704 on or around which a second cable may be provided. The pulley wheels 702, 704 are attached to the frame 210 via a bracket 706 and are rotatable independent of each other. The channel 120 includes an interior pathway (obscured from view) extending between its bottom end 122 and top end 124 and the pulley wheels 702, 704 are positioned such that their outer peripheral portions extend into the interior pathway of the channel 120. In this manner, a first drive cable may be routed through the top pathway 502 of the channel member 212, over and down around a top of the first pulley wheel 702 and into the interior pathway (obscured from view) of the channel 120, and downward through the interior pathway of the channel 120 towards the bottom end 122, at which point that first drive cable may be fastened to the channel 120 (and/or to the structure to which the channel 120 is secured (e.g., the vehicle 100)). Similarly, a second drive cable may be routed through the bottom pathway (obscured from view) of the channel member (obscured from view, but provided below the illustrated channel member 212), under and up around a bottom of the second pulley wheel 704 and into the interior pathway (obscured from view) of the channel 120, and upward through the interior pathway of the channel 120 towards the top end 124, at which point that second drive cable may be fastened to the channel 120 (and/or to the structure to which the channel 120 is secured (e.g., the vehicle 100)). While FIG. 7 illustrates an example where the first drive cable is routed toward the first pulley wheel 702 in a top pathway 502 and the second drive cable is routed toward the second pulley wheel 704 in a bottom pathway (obscured from view), in other examples the first and second cables may be differently routed, for example, vice versa or in the same pathway (i.e., a common pathway).

FIG. 7 also illustrates a safety bracket system 720, according to one or more embodiments of the present disclosure. In the illustrated example, the safety bracket system 720 includes a bracket 722, a safety pin 724, and a pin lock 726. The channel may have one or more apertures for receiving the safety pin 724, and the bracket 722 may have a pair of apertures for receiving the safety pin 724 and that correspond with the apertures in the channel 120. The bracket 722 may be positioned such that its apertures correspond with the apertures of the channel 120, and then the safety pin 724 may be inserted through the bracket 722 and the channel 120, and then the pin lock 726 may be provided on the safety pin 724 to lock the safety pin 724 in place and inhibit accidental removal of the same. When the bracket 722 is so positioned, the bracket 706 of the third pulley 234a will contact the bracket 722 of the safety bracket system 720 to thereby inhibit further downward translation/positioning of the movable floor 116. Thus, for example, once the movable floor 116 has been elevated to a desired vertical position, the safety bracket system 720 may be utilized to lock or secure the movable floor 116 in that elevation, as the bracket 722 of the safety bracket system 720 would inhibit subsequent lowering of the movable floor 116. While the safety bracket system 720 is illustrated in use at corner A, the safety bracket system 720 may also or instead be implemented at any one or more other corners B,C,D of the movable floor 116.

Figure 8:
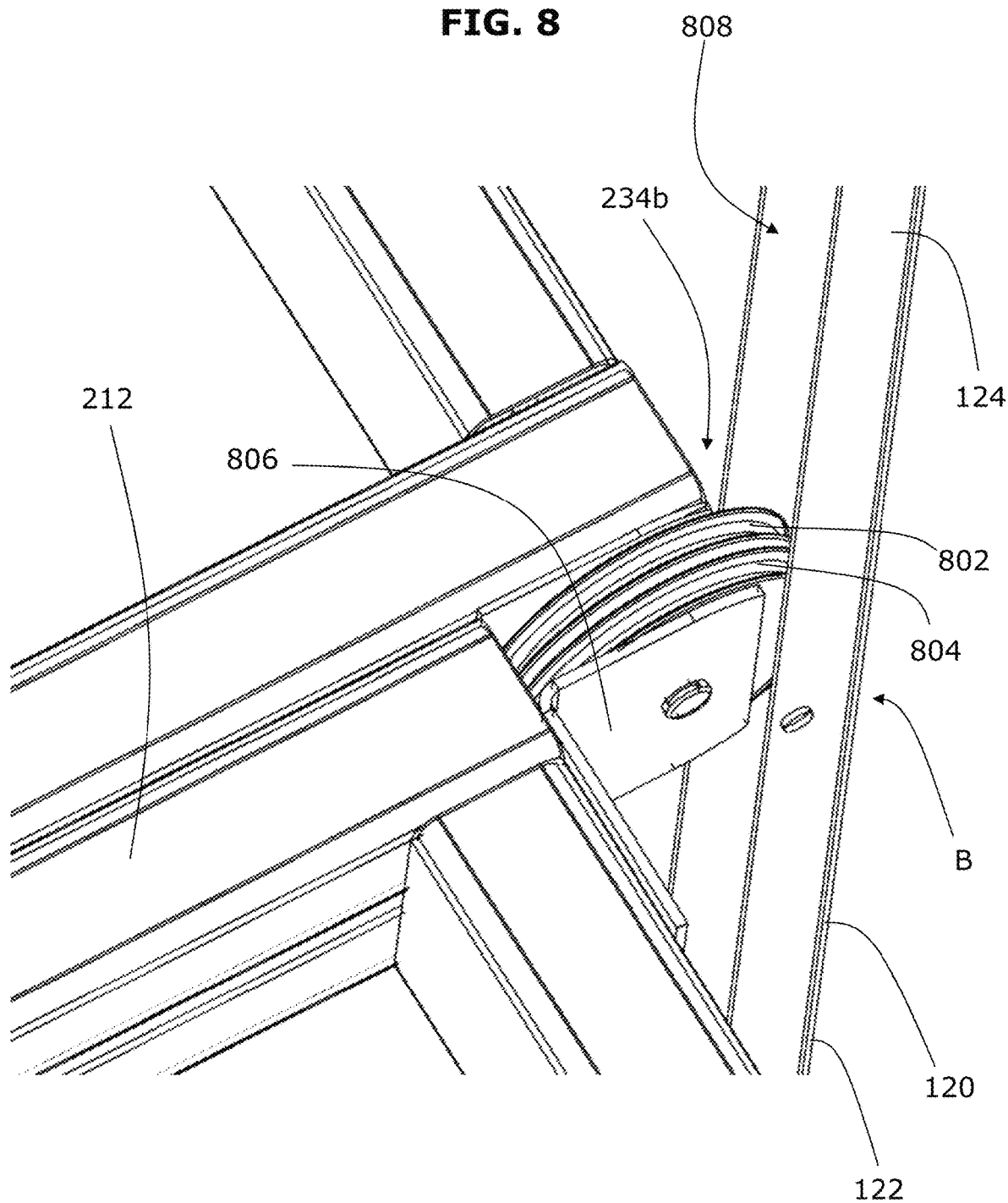
FIG. 8 illustrates a pulley at corner B utilizable with the floor positioning system of FIGS. 2-3, according to one or more embodiments of the present disclosure.

FIG. 8 illustrates the third pulley 234b at corner B, according to one or more embodiments of the present disclosure. In the illustrated example, the third pulley 234b is configured as a double block pulley, meaning it includes two (2) pulley wheels on which two corresponding drive cables may be guided or routed. For example, the third pulley 234b includes a first pulley wheel 802 on or around which a first cable may be provided and a second pulley wheel 804 on or around which a second cable may be provided. The pulley wheels 802, 804 are attached to the frame 210 via a bracket 806 and are rotatable independent of each other. The channel 120 includes an interior pathway 808 extending between its bottom end 122 and top end 124 and the pulley wheels 802, 804 are positioned such that their outer peripheral portions extend into the interior pathway 808 of the channel 120. In this manner, a first drive cable may be routed through the top pathway (obscured from view) of the channel member 212, over and down around a top of the first pulley wheel 802 and into the interior pathway 808 of the channel 120, and downward through the interior pathway 808 of the channel 120 towards the bottom end 122, at which point that first drive cable may be fastened to the channel 120 (and/or to the structure to which the channel 120 is secured (e.g., the vehicle 100)). Similarly, a second drive cable may be routed through the bottom pathway (obscured from view) of the channel member (obscured from view), under and up around a bottom of the second pulley wheel 804 and into the interior pathway 808 of the channel 120, and upward through the interior pathway 808 of the channel 120 towards the top end 124, at which point that second drive cable may be fastened to the channel 120 (and/or to the structure to which the channel 120 is secured (e.g., the vehicle 100)). While FIG. 8 illustrates an example where the first drive cable is routed toward the first pulley wheel 802 in a top pathway and the second drive cable is routed toward the second pulley wheel 804 in a bottom pathway, in other examples the first and second cables may be differently routed, for example, vice versa or in the same pathway (i.e., a common pathway). While not illustrated, the safety bracket system 720 may be implemented on the channel member 120 corresponding with corner B as described above.

Figure 9:
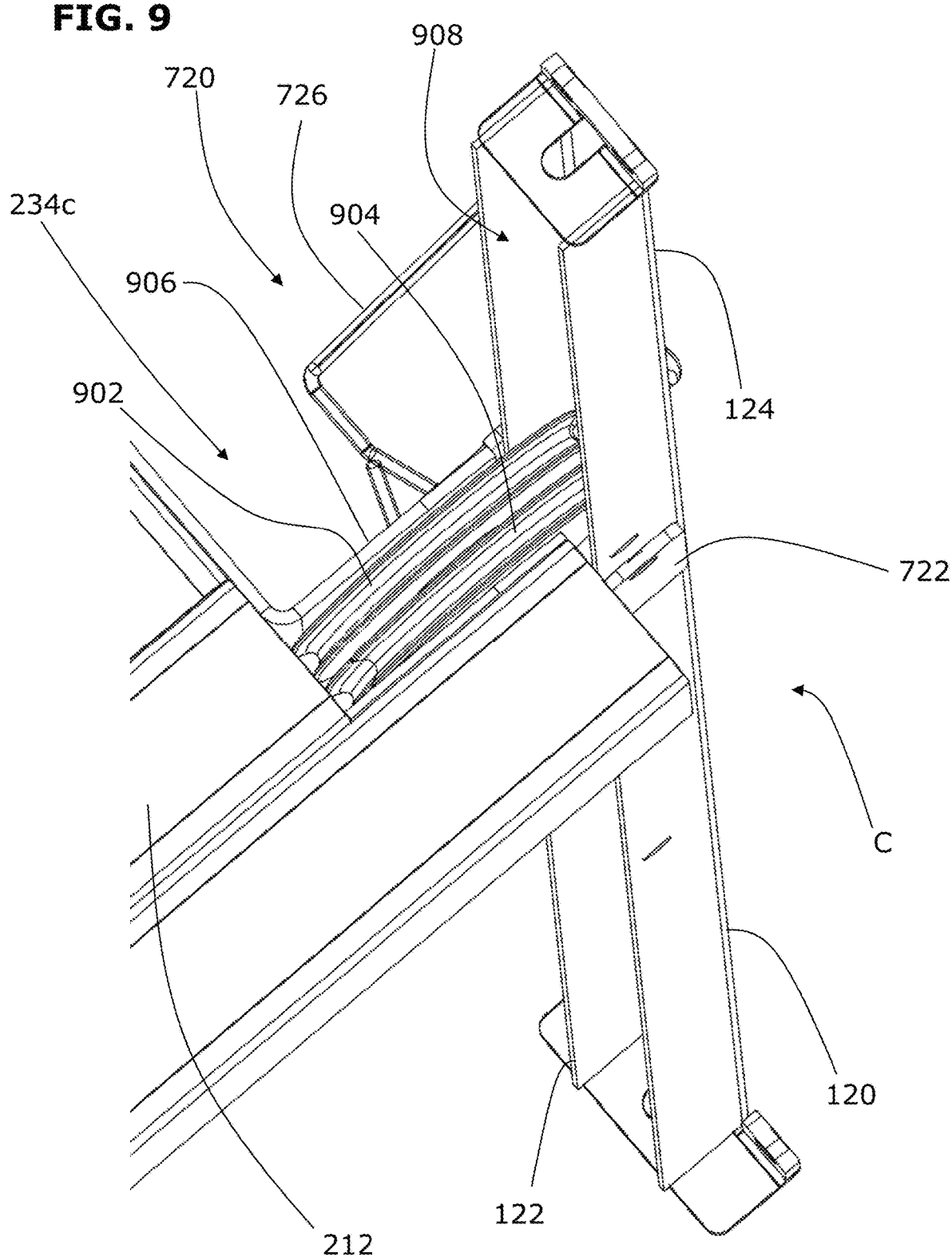
FIG. 9 illustrates a pulley at corner C utilizable with the floor positioning system of FIGS. 2-3, according to one or more embodiments of the present disclosure.

FIG. 9 illustrates the pulley 234c at corner C, according to one or more embodiments of the present disclosure. In the illustrated example, the third pulley 234c is configured as a double block pulley, meaning it includes two (2) pulley wheels on which two corresponding drive cables may be guided or routed. For example, the third pulley 234c includes a first pulley wheel 902 on or around which a first cable may be provided and a second pulley wheel 904 on or around which a second cable may be provided. The pulley wheels 902, 904 are attached to the frame 210 via a bracket 906 and are rotatable independent of each other. The channel 120 includes an interior pathway 908 extending between its bottom end 122 and top end 124 and the pulley wheels 902, 904 are positioned such that their outer peripheral portions extend into the interior pathway 908 of the channel 120. In this manner, a first drive cable may be routed through the top pathway (obscured from view) of the channel member 212, over and down around a top of the first pulley wheel 902 and into the interior pathway 908 of the channel 120, and downward through the interior pathway 908 of the channel 120 towards the bottom end 122, at which point that first drive cable may be fastened to the channel 120 (and/or to the structure to which the channel 120 is secured (e.g., the vehicle 100)). Similarly, a second drive cable may be routed through the bottom pathway (obscured from view) of the channel member (obscured from view), under and up around a bottom of the second pulley wheel 904 and into the interior pathway 908 of the channel 120, and upward through the interior pathway 908 of the channel 120 towards the top end 124, at which point that second drive cable may be fastened to the channel 120 (and/or to the structure to which the channel 120 is secured (e.g., the vehicle 100)). While FIG. 9 illustrates an example where the first drive cable is routed toward the first pulley wheel 902 in a top pathway and the second drive cable is routed toward the second pulley wheel 904 in a bottom pathway, in other examples the first and second cables may be differently routed, for example, vice versa or in the same pathway (i.e., a common pathway).

In addition, FIG. 9 illustrates an example where the safety bracket system 720 is implemented on the channel member 120 corresponding with corner C.

Figure 10:
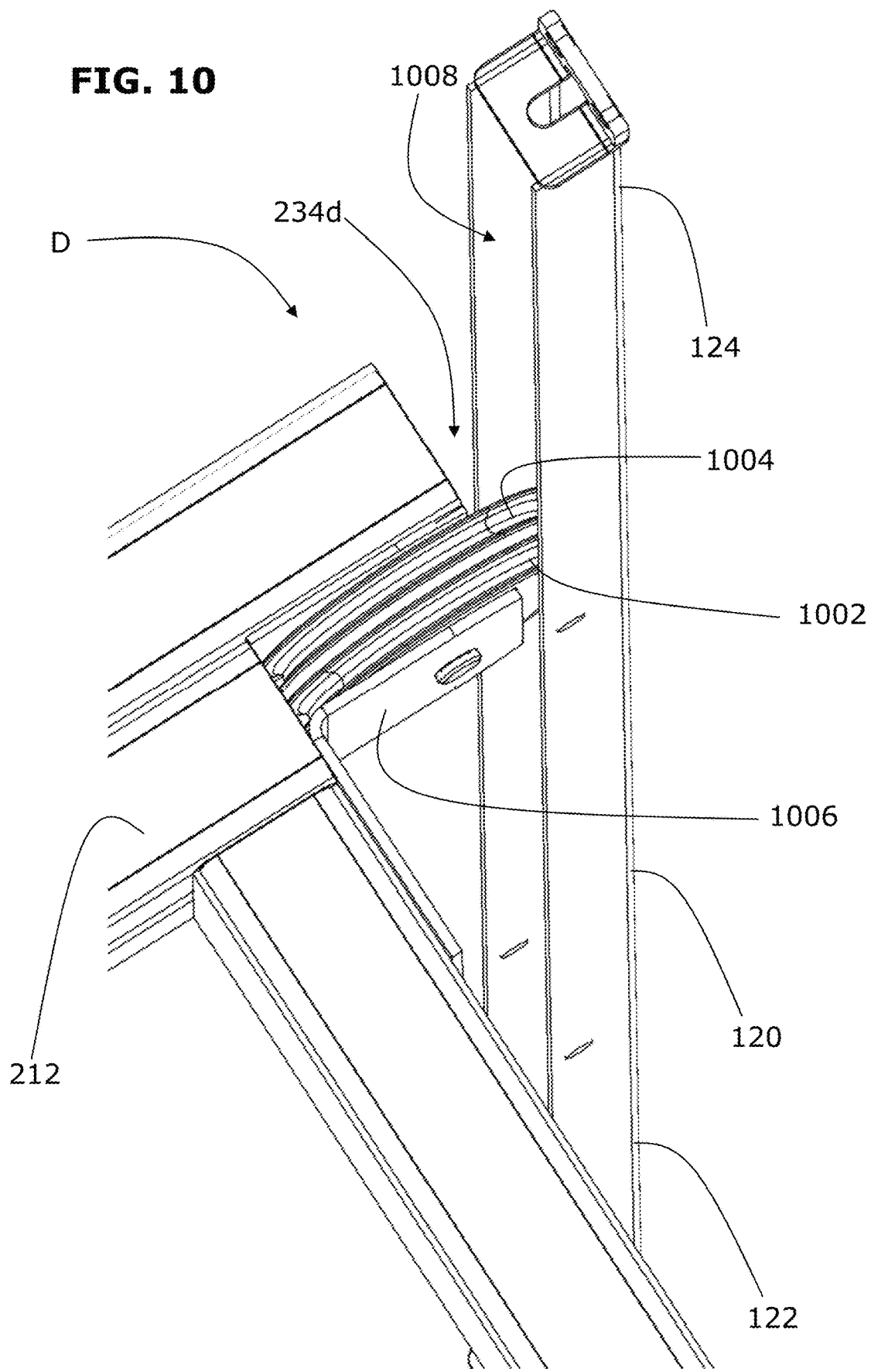
FIG. 10 illustrates a pulley at corner D utilizable with the floor positioning system of FIGS. 2-3, according to one or more embodiments of the present disclosure.

FIG. 10 illustrates the pulley 234d at corner D, according to one or more embodiments of the present disclosure. In the illustrated example, the third pulley 234d is configured as a double block pulley, meaning it includes two (2) pulley wheels on which two corresponding drive cables may be guided or routed. For example, the third pulley 234d includes a first pulley wheel 1002 on or around which a first cable may be provided and a second pulley wheel 1004 on or around which a second cable may be provided. The pulley wheels 1002, 1004 are attached to the frame 210 via a bracket 1006 and are rotatable independent of each other. The channel 120 includes an interior pathway 1008 extending between its bottom end 122 and top end 124 and the pulley wheels 1002, 1004 are positioned such that their outer peripheral portions extend into the interior pathway 1008 of the channel 120. In this manner, a first drive cable may be routed through the top pathway (obscured from view) of the channel member 212, over and down around a top of the first pulley wheel 1002 and into the interior pathway 1008 of the channel 120, and downward through the interior pathway 1008 of the channel 120 towards the bottom end 122, at which point that first drive cable may be fastened to the channel 120 (and/or to the structure to which the channel 120 is secured (e.g., the vehicle 100)). Similarly, a second drive cable may be routed through the bottom pathway (obscured from view) of the channel member (obscured from view), under and up around a bottom of the second pulley wheel 1004 and into the interior pathway 1008 of the channel 120, and upward through the interior pathway 1008 of the channel 120 towards the top end 124, at which point that second drive cable may be fastened to the channel 120 (and/or to the structure to which the channel 120 is secured (e.g., the vehicle 100)). While FIG. 10 describes an example where the first drive cable is routed toward the first pulley wheel 1002 in a top pathway and the second drive cable is routed toward the second pulley wheel 1004 in a bottom pathway, in other examples the first and second cables may be differently routed, for example, vice versa or in the same pathway (i.e., a common pathway). While not illustrated, the safety bracket system 720 may be implemented on the channel member 120 corresponding with corner D as described above.

Figure 11A:
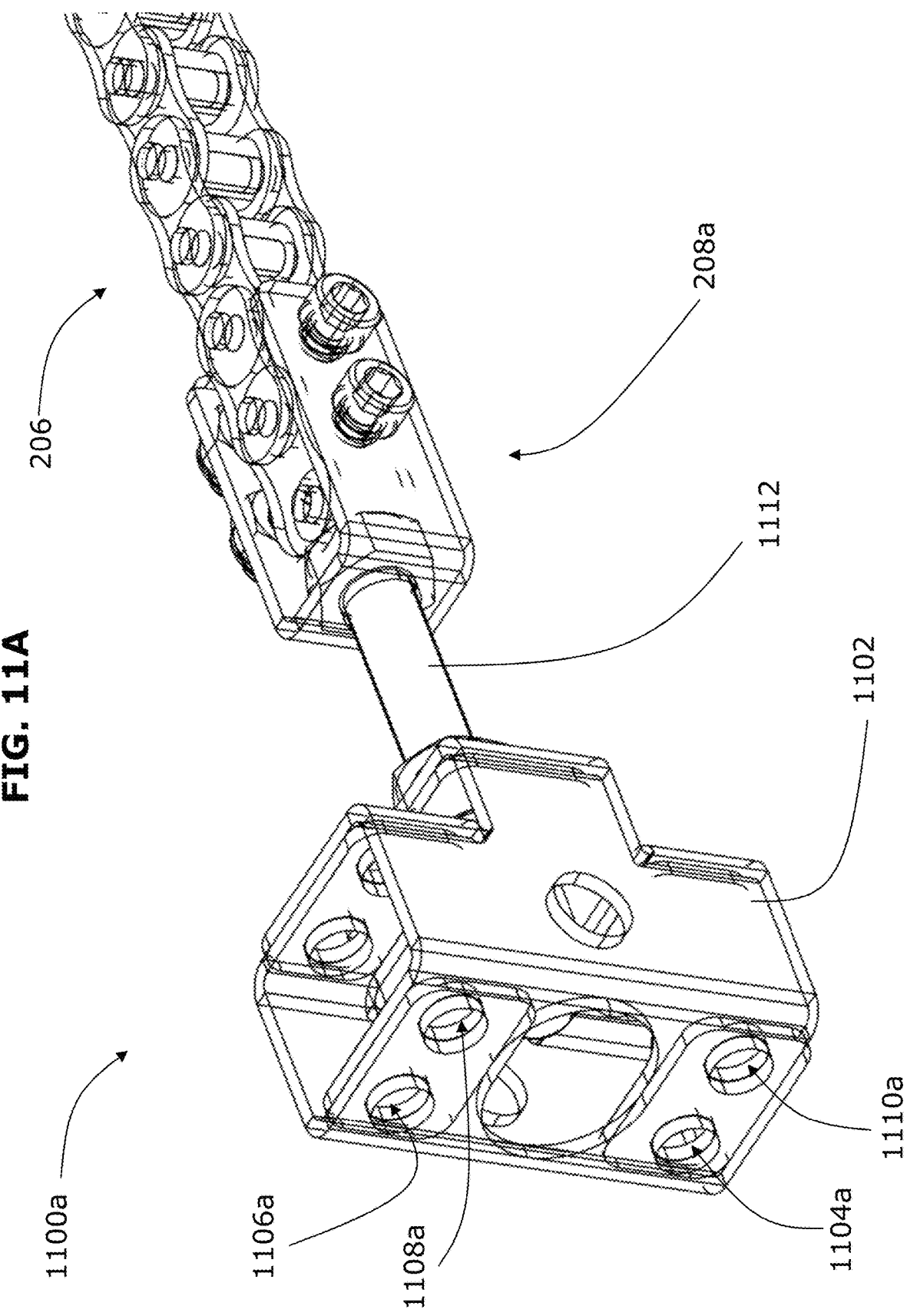
FIGS. 11A and 11B illustrate exemplary ends of the drive chain utilizable with the floor positioning system of FIGS. 2-3, according to one or more embodiments of the present disclosure.
Figure 11B:
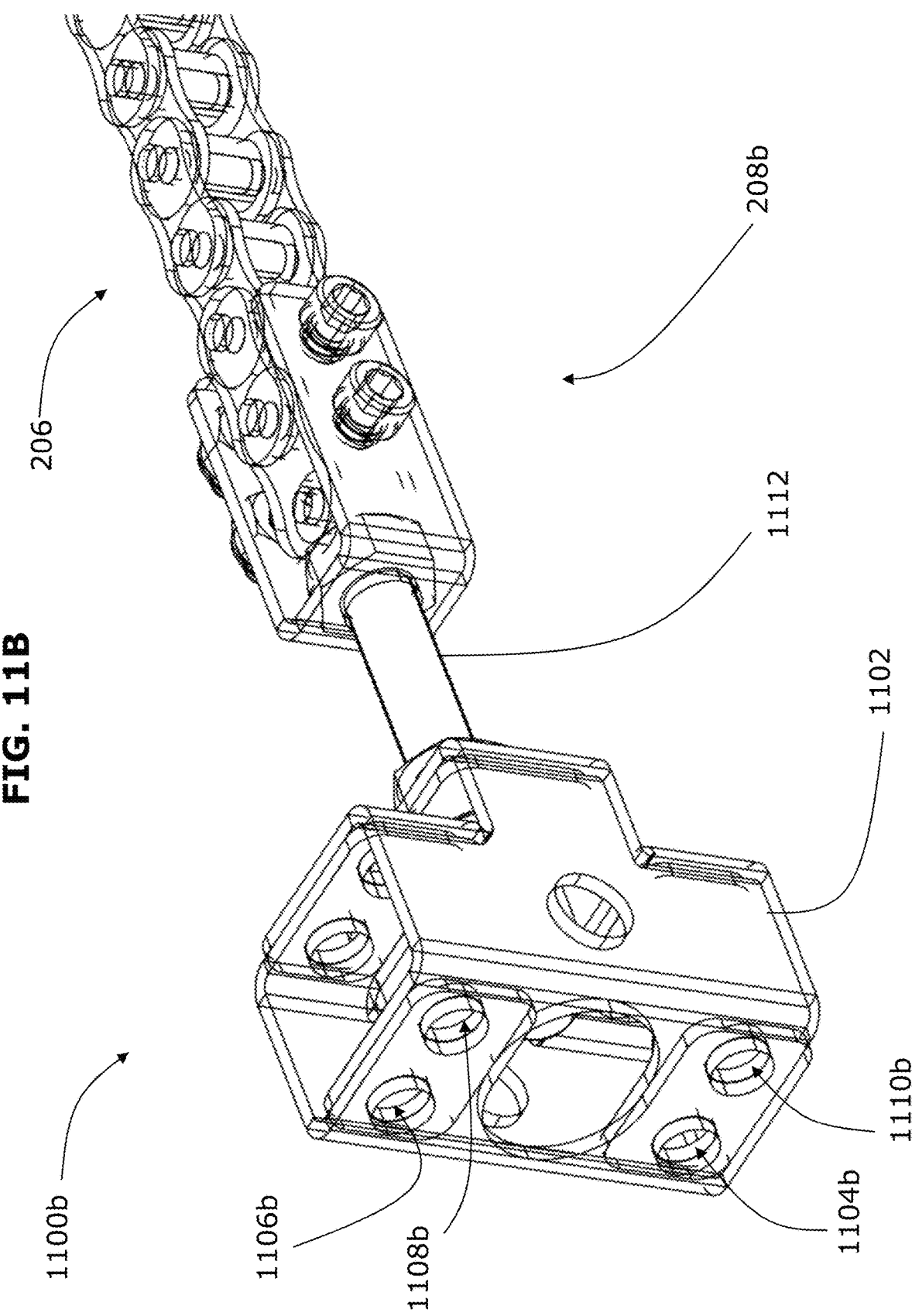

FIGS. 11A and 11B illustrate an example embodiment of the drive chain 206 configured as a strand, according to one or more embodiments of the present disclosure. In particular, FIG. 11A illustrates a first fitting 1100a configured to secure a first set of drive cables to the first end 208a of the drive chain 206 and FIG. 11B illustrates a second fitting 1100b configured to secure a second set of drive cables to the second end 208b of the drive chain 206, according to one or more embodiments of the present disclosure.

The fittings 1100a, 1100b each include a body 1102 configured to receive a set of drive cables. In the illustrated example, the first set of drive cables includes four (4) drive cables and the body 1102 includes an aperture for securing each of the four (4) drive cables. Here, the first fitting 1100a includes a first aperture 1104a for receiving a first drive cable (of the first set of cables), a second aperture 1106a for receiving a second drive cable (of the first set of cables), a third aperture 1108a for receiving a third drive cable (of the first set of cables), and a fourth aperture 1110a for receiving a fourth drive cable (of the first set of cables). Similarly, in the illustrated example, the second set of drive cables includes four (4) drive cables and the body 1102 of the second fitting 1100b includes an aperture for securing each of the four (4) drive cables in that second set of drive cables. Here, the second fitting 1100b includes a first aperture 1104b for receiving a first drive cable (of the second set of cables), a second aperture 1106b for receiving a second drive cable (of the second set of cables), a third aperture 1108b for receiving a third drive cable (of the second set of cables), and a fourth aperture 1110b for receiving a fourth drive cable (of the second set of cables). Accordingly, in the illustrated example, the positioning system utilizes eight (8) drive cables, organized in two (2) sets of four (4) cables.

One or more of the drive cables may be adjustably attached to their respective fitting 1100. Also or instead, the body 1102 of either or both fittings 1100a, 1100b may be adjustably attached to its respective end 208a, 208b of the drive chain 206. For example, the body 1102 may be attached to its corresponding chain end 208a, 208b via a threaded cylinder, the length of which may be increased or decreased via rotation of one or more nuts. Accordingly, the end user may adjust the tension in the drive chain 206 and/or the various drive cables as may be desirable.

As mentioned, the first set of cables are attachable to the first fitting 1100a and the second set of cables are attachable to the second fitting 1100b. In this example, the first cable 222a of the first set of drive cables is fixed to the first fitting 1100a (at the first aperture 1104a), and extends therefrom towards the first pulley 230a where it is routed around the first wheel 402a (or second wheel 404a) thereof to extend back towards the motor 202 and towards the second pulley 232a, where it is routed around the first wheel 602a (or the second wheel 604a) thereof to extend towards the third pulley 234a, where it is routed around the first wheel 702 (or the second wheel 704) thereof to extend into the passage (obscured) of that channel 120 and downward therein towards the bottom end 122 of the channel 120 at that corner A, at which a second end of the first cable 222a is attached to the recreational vehicle 100. The second cable 222b of the first set of drive cables is also fixed to the first fitting 1100a (at the second aperture 1106a), and extends therefrom towards the first pulley 230b where it is routed around the first wheel 402b (or the second wheel 404b) thereof to extend back towards the motor 202 and towards the second pulley 232b, where it is routed around the first wheel 602b (or the second wheel 604b) thereof to extend towards the third pulley 234b at corner B, where it is routed around the first wheel 802 (or the second wheel 804) thereof to extend into the passage 808 of that channel 120 and downward therein towards the bottom end 122 of the channel 120 at that corner B, at which a second end of the second cable 222b is attached to the recreational vehicle 100. The third cable 222c of the first set of drive cables is also fixed to the first fitting 1100a (at the third aperture 1108a), and extends therefrom towards the first pulley 230b where it is routed around the second wheel 404b (or the first wheel 402b) thereof to extend towards the third pulley 234c at corner C, where it is routed around the first wheel 902 (or the second wheel 904) thereof to extend into the passage 908 of that channel 120 and downward therein towards the bottom end 122 of the channel 120 at that corner C, at which a second end of the third cable 222c is attached to the recreational vehicle 100. The fourth cable 222d of the first set of drive cables is also fixed to the first fitting 1100a (at the fourth aperture 1110a), and extends therefrom towards the first pulley 230a where it is routed around the second wheel 404a (or the first wheel 402a) thereof to extend towards the third pulley 234d at corner D, where it is routed around the first wheel 1002 (or the second wheel 1004) thereof to extend into the passage 1008 of that channel 120 and downward therein towards the bottom end 122 of the channel 120 at that corner D, at which a second end of the fourth cable 222d is attached to the recreational vehicle 100.

As mentioned, the second set of cables are attachable to the second fitting 1100b. In this example, the first cable 224a of the second set of drive cables is fixed to the second fitting 1100b (at the first aperture 1104b), and extends therefrom towards the first pulley 230a where it is routed around the third wheel 406a (or fourth wheel 408a) thereof to extend back towards the motor 202 and towards the second pulley 232a, where it is routed around the second wheel 604a (or the first wheel 602a) thereof to extend towards the third pulley 234a at corner A, where it is routed around the second wheel 704 (or the first wheel 702) thereof to extend into the passage (obscured) of that channel 120 and upward therein towards the top end 124 of the channel 120 at that corner A, at which a second end of the first cable 224a is attached to the recreational vehicle 100. The second cable 224b of the second set of drive cables is also fixed to the second fitting 1100b (at the second aperture 1106b), and extends therefrom towards the first pulley 230b where it is routed around the third wheel 406b (or the fourth wheel 408b) thereof to extend back towards the motor 202 and towards the second pulley 232b, where it is routed around the second wheel 604b (or the first wheel 602b) thereof to extend towards the third pulley 234b at corner B, where it is routed around the second wheel 804 (or the first wheel 802) thereof to extend into the passage 808 of that channel 120 and upward therein towards the top end 124 of the channel 120 at that corner B, at which a second end of the second cable 224b is attached to the recreational vehicle 100. The third cable 224c of the second set of drive cables is also fixed to the second fitting 1100b (at the third aperture 1108b), and extends therefrom towards the first pulley 230b where it is routed around the fourth wheel 408b (or the third wheel 406b) thereof to extend towards the third pulley 234c at corner C, where it is routed around the second wheel 904 (or the first wheel 902) thereof to extend into the passage 908 of that channel 120 and upward therein towards the top end 124 of the channel 120 at that corner C, at which a second end of the third cable 224c is attached to the recreational vehicle 100. The fourth cable 224d of the second set of drive cables is also fixed to the second fitting 1100b (at the fourth aperture 1110b), and extends therefrom towards the first pulley 230a where it is routed around the fourth wheel 408a (or the third wheel 406a) thereof to extend towards the third pulley 234d at corner D, where it is routed around the second wheel 1004 (or the first wheel 1002) thereof to extend into the passage 1008 of that channel 120 and upward therein towards the top end 124 of the channel 120 at that corner D, at which a second end of the fourth cable 224d is attached to the recreational vehicle 100.

The fittings 1100a, 110b, the first and second pulleys 230a, 230b, and the second pulleys 232a, 232b are all arranged to allow organization of the various drive cables without the cables contacting and rubbing against each other during actuation.

As can be seen in FIGS. 4-5, the first wheels 402a, 402b of the first pulleys 230a, 230b are aligned in a same plane (i.e., the first wheels 402a, 402b are co-planar with each other), and the second wheels 404a, 404b of the first pulleys 230a, 230b are also aligned in a same plane (i.e., the second wheels 404a, 404b are co-planar with each other). As can be seen in FIG. 6, the first wheels 602a, 602b of the second pulleys 232a, 232b are aligned in a same plane (i.e., the first wheels 602a, 602b are co-planar with each other). In the illustrated example, the first wheels 602a, 602b of the second pulleys 232a, 232b are co-planar with the first wheels 402a, 402b of the first pulleys 230a, 230b. However, first wheels 602a, 602b of the second pulleys 232a, 232b may instead be co-planar with the second wheels 404a, 404b of the first pulleys 230a, 230b, or may be arranged in a parallel plane oriented between the planes of the first wheels 402a, 402b and the second wheels 404a, 404b, depending on how the drive cables are routed.

Also in the illustrated example, the first end 208a of the drive chain extends in a plane that is co-planar with the plane of the first wheels 402a, 402b of the first pulleys 230a, 230b or with the plane of the second wheels 404a, 404b of the first pulleys 230a, 230b, or the first end 208a of the drive chain 206 may extend in a parallel plane oriented between the planes of the first wheels 402a, 402b and the second wheels 404a, 404b. Thus, the two (2) drive cables attached at the first and second apertures 1104a, 1106a of the first fitting 1100a extend towards the first wheels 402a, 402b in a first plane and the other two (2) drive cables attached at the third and fourth apertures 1108a, 1110a of the first fitting 1100a extend towards the second wheels 404a, 404b in a second plane. In this manner, the two (2) drive cables extending towards the first wheels 402a, 402b will not contact and interfere with the two (2) drive cables extending towards the second wheels 404a, 404b of the first pulleys 230a, 230b, thereby inhibiting wear and premature failure of the first set of drive cables.

The third wheels 406a, 406b of the first pulleys 230a, 230b, the fourth wheels 408a, 408b of the first pulleys 230a, 230b, and the second wheels 604a, 604b of the second pulleys 232a, 232b may be similarly arranged so as to receive the four (4) drive cables attached to the second fitting 1100b at the second end 208b of the drive cable 206. In this manner, the two (2) drive cables attached at the first and second apertures 1104b, 1106b of the second fitting 1100b and extending towards the third wheels 406a, 406b will not contact and interfere with the two (2) drive cables attached at the third and fourth apertures 1108b, 1110b of the second fitting 1100b and extending towards the fourth wheels 408a, 408b of the first pulleys 230a, 230b, thereby inhibiting wear and premature failure of the second set of drive cables.

As previously mentioned, the channels 120 may be at least partially covered. In this manner, end users will be protected from getting clothing caught in the interior pathways defined therein and/or from getting fingers or other body parts pinched therein during actuation movable floor 116 via the positioning system 200. FIG. 12 illustrates an exemplary cover 1200 that may be utilized on one or more of the channels 120, to inhibit access to the interior pathways defined the channels 120. In the illustrated example, one of the covers 1200 is provided at each of the channels 120 at each of the corners A,B,C,D, and functions as an upper position limit for the movable floor 116. Thus, the covers 1200 may be secured to the channels 120 such that they do not slide thereon via movement of the movable floor 116. The covers 1200 are provided on an upper side of the movable floor 116 and may also function to inhibit access to such interior pathway when on the movable floor 116.

In other examples, the covers 120 may be slidable on the channels 120, such that they slide upward and downward with the movable floor 116. For example, when the movable floor 116 is at an extreme downward position, the covers 1200 will cover portions of the channels 120 at the lower ends 122 and, as the movable floor 116 is re-positioned upward, the covers 1200 will slide upward with the movement of the floor 116 to cover portions of the channels 120 that correspond with the vertical position of the floor 116. In some examples, the covers 1200 are configured to telescope, such that the movable floor 116 may be moved into an extreme upward position proximate at the top end 124 of the channels 120. The covers 120 may be attached to the movable floor 116, or may be discrete, separate components that are physically pushed by the movable floor 116 during upward movement of the floor 116.

In the illustrated example, the first set of cables are each attached to the drive chain and then each routed through the various pulleys to a respective corner A,B,C,D, and then each drive cable (of the first set) is routed into a lower (or upper) end of its respective channel corresponding with a lower surface (or upper surface) of the enclosure (e.g., of a recreational vehicle or room). The second set of cables are each attached at an opposite end (or side) of the drive chain and then routed through the various pulleys to a respective corner A,B,C,D, and then each drive cable (of the second set of cables) is routed into an upper (or lower) end of its respective channel corresponding with an upper (or lower) surface of the enclosure. Thus, as the motor pulls the drive chain in a first direction, it pulls the second (or first) set of drive cables while providing slack to the first (or second) set of drive cables, resulting in the floor being raised or pulled towards the upper surface (or ceiling) of the enclosure; whereas, as the motor pulls the drive chain in a second direction (opposite from the first direction), it pulls the first (or second) set of drive cables while providing slack to the second (or first) set of drive cables, resulting in the floor being lowered or pulled towards the lower surface (e.g., floor) of the enclosure.

Figure 13:
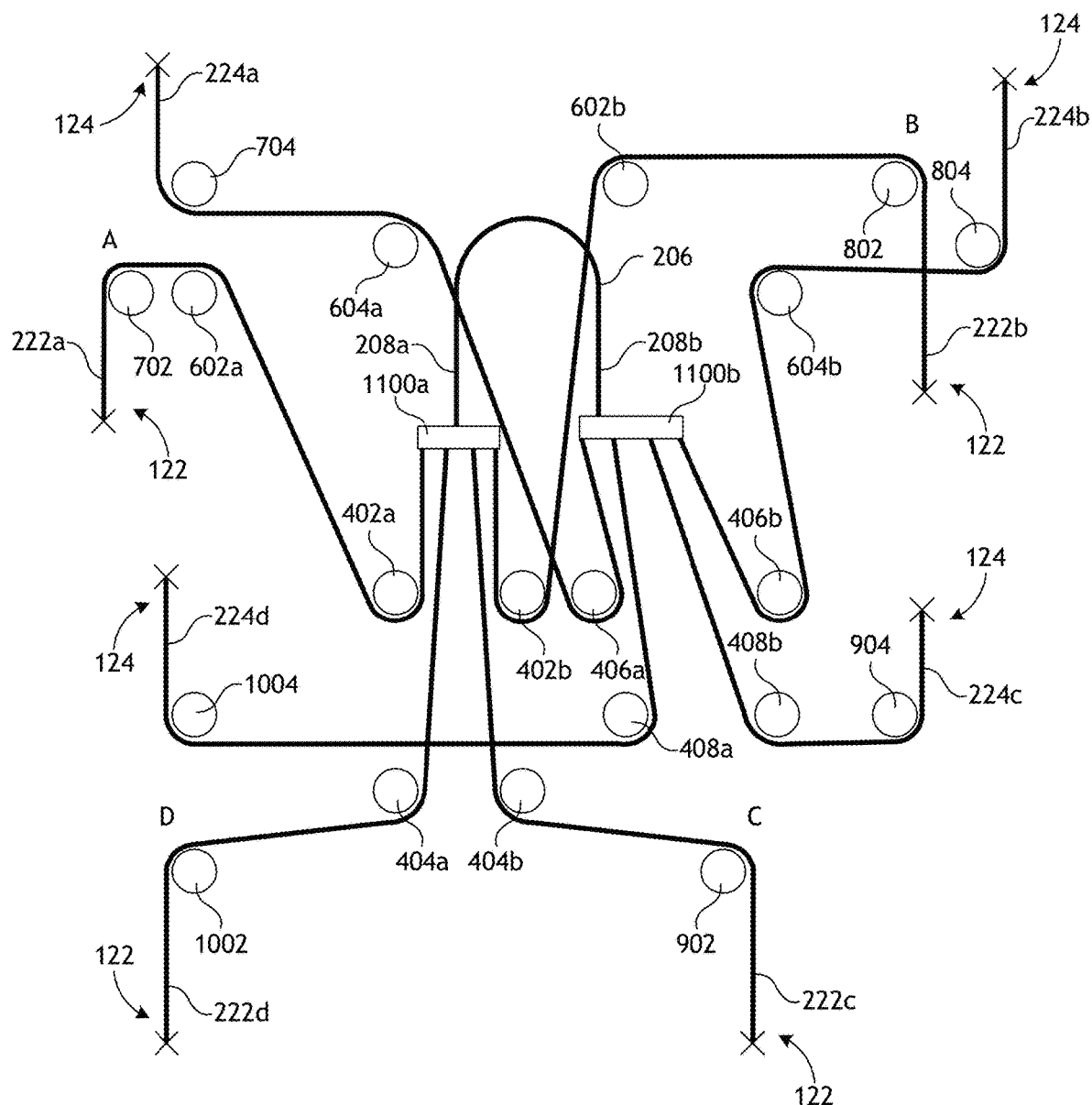
FIG. 13 is a schematic of the drive cable routing depicting example operation of the floor positioning system of FIGS. 2-3, according to one or more embodiments of the present disclosure.

FIG. 13 is a schematic of an exemplary drive cable routing and illustrates example operation of the positioning system 200, according to one or more embodiments of the present disclosure. In particular, FIG. 13 illustrates an example routing of cables 222a-d and 224a-d extending from chain ends 208a-b as described above with reference to FIGS. 4-11.

Figure 14:
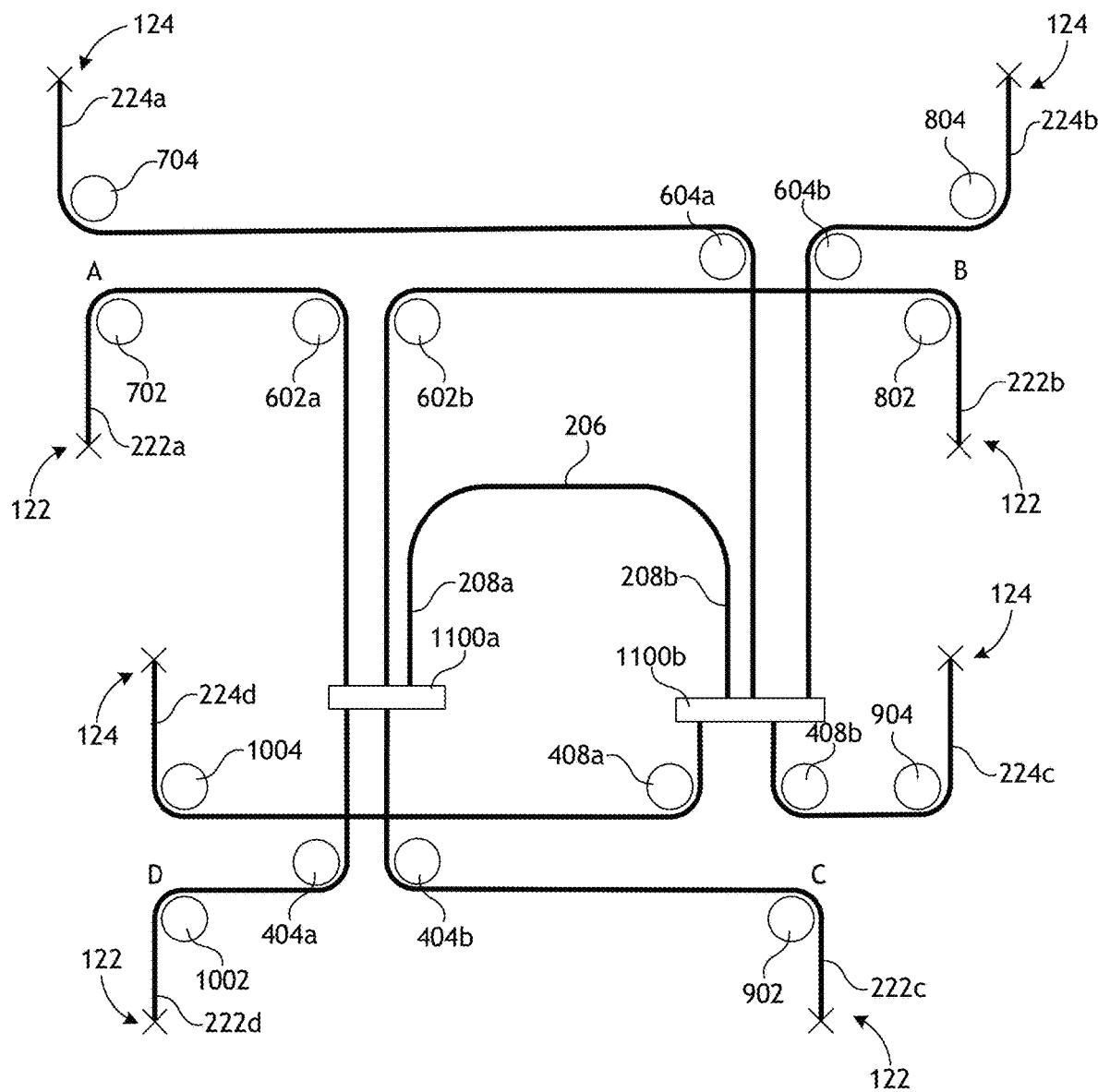
FIG. 14 is a schematic of an alternate drive cable routing depicting example operation of the floor positioning system, according to one or more alternate embodiments of the present disclosure.

FIG. 14 illustrates an alternate routing drive cable routing and illustrates example operation of the positioning system 200, according to one or more alternate embodiments of the present disclosure. In the illustrated example, the cables extend from each of their respective chain end 208a, 208b in opposite directions (i.e., towards the motor and away from the motor). For example, cables 222a and 222b extend away from the chain end 208a in a first direction (i.e., towards the motor), whereas the cables 222c and 222d extend away from the chain end 208a in a second direction (i.e., away from the motor). Similarly, cables 224a and 224b extend away from the chain end 208b in the first direction (i.e., towards the motor), whereas the cables 224c and 224d extend away from the chain end 208b in the second direction (i.e., away from the motor). With this routing, the cables 222a and 224a may be routed directly to the second pulleys 232a and the cables 222b and 224b may be routed directly to the second pulleys 232b. For example, the cable 222a may be routed directly to the first wheel 602a of the second pulley 232a and then to first wheel 702 of the third pulley 234a at corner A, the cable 222b may be routed to the first wheel 602b of the second pulley 232b and then to first wheel 802 of the third pulley 234b at corner B, the cable 224a may be routed directly to the second wheel 604a of the second pulley 232a and then to second wheel 704 of the third pulley 234a at corner A, and the cable 224b may be routed to the second wheel 604b of the second pulley 232b and then to second wheel 804 of the third pulley 234b at corner B.

Figure 15:
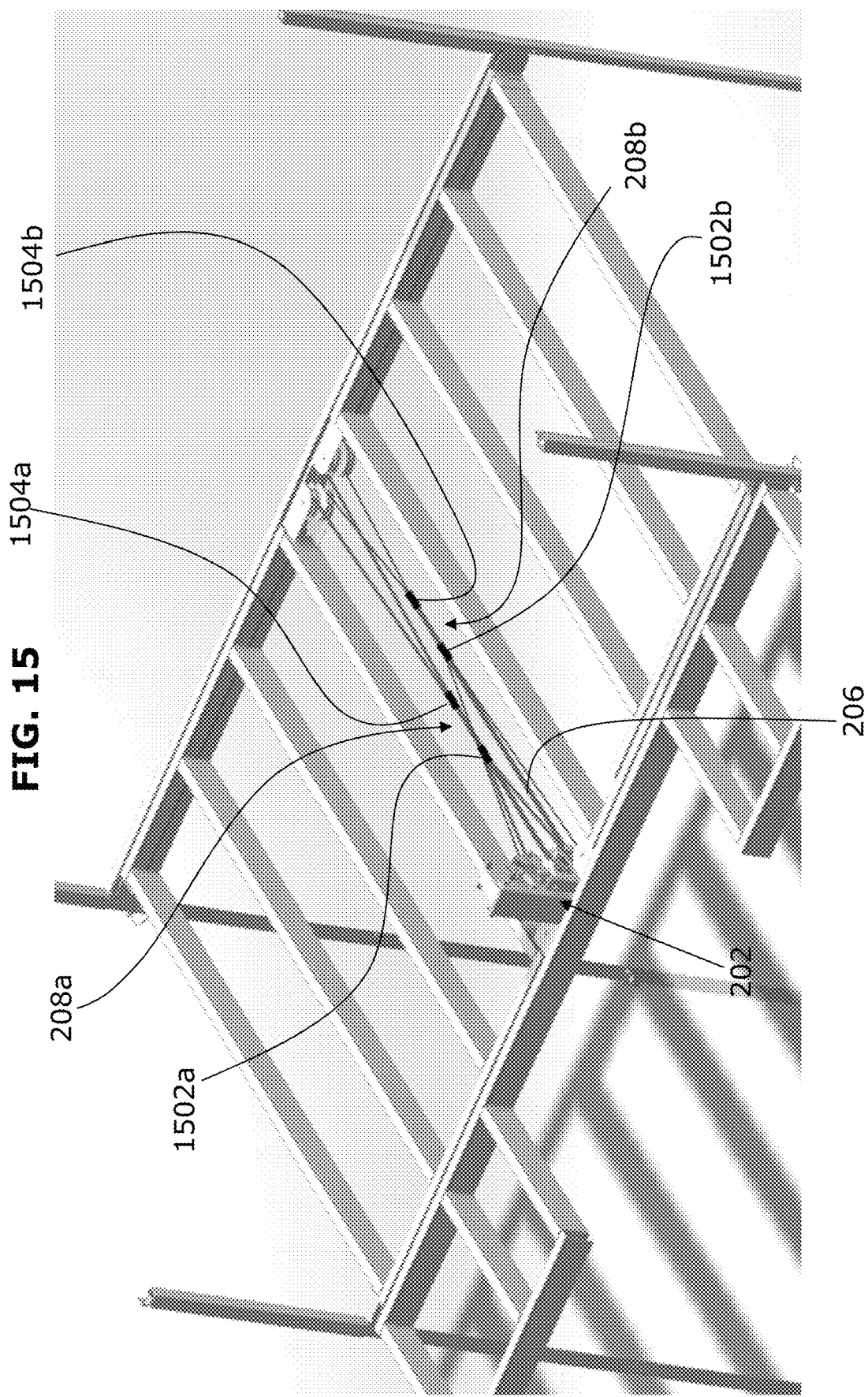
FIG. 15 is an alternate example of the floor positioning system according to one or more alternate embodiments.

In the illustrated example of FIG. 14, all of the cables extend from their respective fitting. For example, each of the drive cables 222a-d are mounted at and extend from the first fitting 1100a and each of the drive cables cables 224a-d are mounted at and extend from the second fitting 1100b. However, one or more of the drive cables at each end 208a, 208b of the chain 206 may be separately attached at their respective chain end, such that they extend from their respective chain end 208 at different positions. For example, each chain 208a, 208b end may have a first fitting 1502a, 1502b at which the pair of cables extending towards the motor are attached to the chain 206 and a second fitting 1504a, 1504b at which the pair of cables extending away from the motor are attached to the chain 206, respectively. In one example illustrated in FIG. 15, the chain end 208a has a first fitting 1502a and a second fitting 1504a, with the cables 222a, 222b being attached to the first fitting 1502a at the first end 208a of the chain 206 and extending towards the motor 202, and with the cables 222c, 222d being attached to the second fitting 1504a at the first end 208a of the chain 206 and extending away from the motor 202. Similarly in this example, the cables 224a, 224b being attached to the first fitting 1502b at the second end 208b of the chain 206 and extending towards the motor 202, and with the cables 224c, 224d being attached to the second fitting 1504b at the second end 208b of the chain 206 and extending away from the motor 202.

Figure 16:
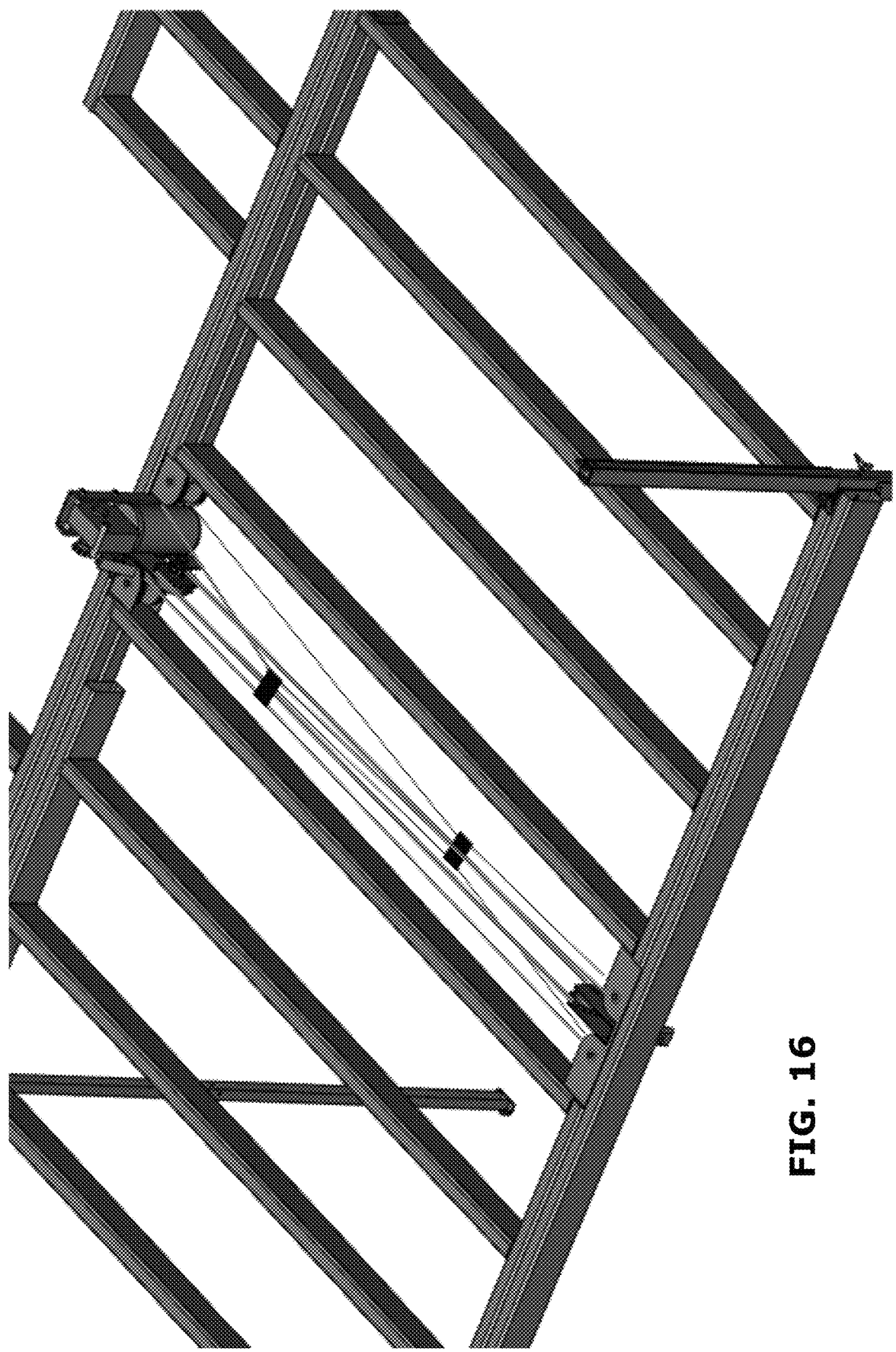
FIG. 16 illustrates an example configuration of the floor positioning system using a loop of chain according to one or more embodiments.

The above-described examples generally illustrate the drive chain 206 when configured as a U-shape strand (i.e., non-continuous strand of chain). However, the chain may instead be configured a loop (or closed loop or continuous chain). This loop of chain may be comprised of a single strand of chain where the ends of such strand are attached together to define a continuous or closed loop, or the loop of chain may be comprised of two or more strands or segments that are attached to each other to form define a continuous or closed loop of strands. FIG. 16 illustrates an example using a loop of chain according to one or more embodiments. In these examples, a pair of fittings may be attached on either side of the chain loop, similar as described in FIGS. 11 and 13-15, with all cables extending in the same direction or with half of the cables extending towards the motor and the other half extending away from the motor, from one or more fittings at each side of the chain. In other examples, however, a single fitting is provided on the continuous loop of chain, with all cables extending from the same or opposite sides.

Therefore, the disclosed systems and methods are well adapted to attain the ends and advantages mentioned as well as those that are inherent therein. The particular embodiments disclosed above are illustrative only, as the teachings of the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope of the present disclosure. The systems and methods illustratively disclosed herein may suitably be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the elements that it introduces. If there is any conflict in the usages of a word or term in this specification and one or more patent or other documents that may be incorporated herein by reference, the definitions that are consistent with this specification should be adopted.

The use of directional terms such as above, below, upper, lower, upward, downward, left, right, and the like are used in relation to the illustrative embodiments as they are depicted in the figures, the upward or upper direction being toward the top of the corresponding figure and the downward or lower direction being toward the bottom of the corresponding figure.

As used herein, the phrase "at least one of" preceding a series of items, with the terms "and" or "or" to separate any of the items, modifies the list as a whole, rather than each member of the list (i.e., each item). The phrase "at least one of" allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

What is claimed is:

1. A system for positioning a movable floor within a structure, the system comprising:
    a drive chain;
    a first set of cables extending between the drive chain and the structure;
    a second set of cables extending between the drive chain and the structure; and
    a plurality of pulleys routing each of the first set of cables from the drive chain to an upper end of the structure and routing each of the second set of cables from the drive chain to a lower end of the structure;
    wherein actuation of the drive chain in a first direction pulls the first set of cables while providing slack in the second set of cables to thereby translate the plurality of pulleys towards the upper end of the structure.

2. The system of claim 1, wherein actuation of the drive chain in an opposite second direction pulls the second set of cables while providing slack in the first set of cables to thereby translate the plurality of pulleys towards the lower end of the structure.

3. The system of claim 2, wherein a first end of each of the first set of cables is attached to the first chain end and a first end of each of the second set of cables is attached to the second chain end.

4. The system of claim 1, further comprising a plurality of channels secured to walls of the structure, each of the first set of cables being routed from a respective one of the pulleys upward through a respective one of the channels to the upper end of the structure.

5. The system of claim 1, further comprising a plurality of channels secured to walls of the structure, each of the second set of cables being routed from a respective one of the pulleys downward through a respective one of the channels to the lower end of the structure.

6. The system of claim 1, further comprising a motor driven sprocket supported by the movable floor, wherein at least a portion of the drive chain engages the motor driven sprocket.

7. The system of claim 1, wherein the plurality of pulleys comprises a pair of first pulleys, wherein each of the first set of cables and each of the second set of cables being guided by either of the pair of first pulleys.

8. The system of claim 7, wherein each of the pair of first pulleys includes a first set of pulley wheels and a second set of pulley wheels, the first set of cables engaging the first set of pulley wheels of the first pulleys and the second set of cables engaging the second set of pulley wheels of the first pulleys.

9. The system of claim 8, wherein the first set of pulley wheels of the pair of first pulleys includes a first pair of wheels in a first plane and a second pair of wheels in a second plane parallel with the first plane, and the second set of pulley wheels of the pair of first pulleys includes a third pair of wheels in a third plane and a fourth pair of wheels in a fourth plane parallel with the third plane.

10. The system of claim 9, wherein the first set of cables includes four drive cables, the first and second drive cables each engaging one of the first pair of wheels, and the third and fourth drive cables each engaging one of the second pair of wheels, and wherein the second set of cables includes four drive cables, the first and second drive cables of the second set each engaging one of the third pair of wheels, and the third and fourth drive cables of the second set each engaging one of the fourth pair of wheels.

11. The system of claim 7, wherein the plurality of pulleys further comprises a pair of second pulleys supported on the movable floor opposite the first pulleys.

12. The system of claim 11, wherein the each of the second pulleys includes a first and second wheel, the first wheels of the second pulleys being engaged by a pair of drive cables of the first set of cables and the second wheels of the second pulleys being engaged by a pair of drive cables of the second set of cables.

13. The system of claim 11, wherein the plurality of pulleys further comprises a plurality of third pulleys supported at a periphery of the movable floor.

14. The system of claim 13, wherein each of the third pulleys includes a first wheel and a second wheel, the first wheel routing one of the first set of cables upward towards the upper end and the second wheel routing one of the second set of cables downwards towards the lower end.

15. The system of claim 14, further comprising a plurality of channels secured to walls of the structure, each of the first set of cables being routed from a respective one of the pulleys upward through a respective one of the channels to the upper end of the structure, and each of the second set of cables being routed from a respective one of the pulleys downward through a respective one of the channels to the lower end of the structure, wherein the first and second wheels of each of the third pulleys at least partially extends into a pathway defined in the respective channel.

16. The system of claim 1, wherein the first set of cables and the second set of cables are adjustably connected to the drive chain.

17. The system of claim 1, wherein the first set of cables and the second set of cables are adjustably connected to the structure.

18. The system of claim 1, wherein the plurality of pulleys are positioned on the movable floor.

19. The system of claim 1, wherein the first set of cables comprise first ends attached to the drive chain and second ends attached at the upper end of the structure, and wherein the second set of cables comprise first ends attached to the drive chain and second ends attached at the lower end of the structure.

20. A positioning system for a structure, the system comprising:
    a movable floor arranged within the structure;
    a drive chain;
    a first set of cables extending between the drive chain and the structure;
    a second set of cables extending between the drive chain the structure; and
    a plurality of pulleys positioned on the movable floor and routing each of the first set of cables from the drive chain to an upper end of the structure and routing each of the second set of cables from the drive chain to a lower end of the structure;

wherein actuation of the drive chain in a first direction pulls the first set of cables while providing slack in the second set of cables to thereby translate the movable floor towards the upper end of the structure.

* * * * *